United States Patent
Hosseini et al.

(10) Patent No.: US 10,015,776 B2
(45) Date of Patent: Jul. 3, 2018

(54) LOW LATENCY POINT TO MULTIPOINT COMMUNICATION TECHNIQUES

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Shimman Arvind Patel, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/365,539

(22) Filed: Nov. 30, 2016

(65) Prior Publication Data

US 2017/0265166 A1     Sep. 14, 2017

Related U.S. Application Data

(60) Provisional application No. 62/306,588, filed on Mar. 10, 2016.

(51) Int. Cl.
*H04W 72/04* (2009.01)
*H04W 72/00* (2009.01)
(Continued)

(52) U.S. Cl.
CPC ....... *H04W 72/005* (2013.01); *H04L 27/2601* (2013.01); *H04W 8/186* (2013.01);
(Continued)

(58) Field of Classification Search
CPC .......... H04W 72/042; H04W 72/0446; H04W 76/28; H04W 72/0453; H04W 72/1247;
(Continued)

(56) References Cited

U.S. PATENT DOCUMENTS

| 2014/0071954 A1 | 3/2014 | Au et al. |
| 2015/0270932 A1* | 9/2015 | Agiwal ................. H04L 1/1887 370/336 |

(Continued)

OTHER PUBLICATIONS

ISA/EP, International Search Report and Written Opinion of the International Searching Authority, Int'l Application No. PCT/US2017/013439, dated May 2, 2017, European Patent Office, Rijswijk, NL, 10 pgs.

*Primary Examiner* — Sai Aung
(74) *Attorney, Agent, or Firm* — Anthony R. Morris

(57) ABSTRACT

Techniques for low latency point to multipoint (PTM) communications in a system supporting communications using multiple different transmission time interval (TTI) durations are provided. The low latency PTM communications may be supported by one or more physical channels that support PTM communications at shortened TTI durations. In some examples, a base station may allocate, in a PTM traffic channel, a first set of resources for PTM transmissions with a first user equipment (UE) and a second UE, and may allocate a second set of resources (e.g., in a physical downlink shared channel (PDSCH)) for unicast transmissions to the first UE. The PTM transmissions may be transmitted using TTIs configured with durations shorter than TTIs used for transmitting unicast transmissions. Different sets of PTM resources may be allocated for different PTM transmissions having different TTI durations.

30 Claims, 24 Drawing Sheets

(51) Int. Cl.
*H04L 27/26* (2006.01)
*H04W 8/18* (2009.01)
*H04W 24/08* (2009.01)
*H04W 76/28* (2018.01)

(52) U.S. Cl.
CPC ......... *H04W 24/08* (2013.01); *H04W 72/042* (2013.01); *H04W 72/0446* (2013.01); *H04W 76/28* (2018.02)

(58) Field of Classification Search
CPC .... H04W 16/14; H04W 24/02; H04L 5/0007; H04L 5/0053; H04L 5/0005; H04L 5/0048; H04L 5/26
See application file for complete search history.

(56) References Cited

U.S. PATENT DOCUMENTS

| | | | |
|---|---|---|---|
| 2015/0334729 A1* | 11/2015 | Ji .................... | H04W 72/0453 370/336 |
| 2016/0066316 A1* | 3/2016 | Bhushan ........... | H04W 72/0446 370/329 |
| 2016/0270059 A1* | 9/2016 | Chen ................. | H04L 5/0051 |

* cited by examiner

LOW LATENCY POINT TO MULTIPOINT COMMUNICATION TECHNIQUES

CROSS REFERENCES

The present application for patent claims priority to U.S. Provisional Patent Application No. 62/306,588, entitled "Low Latency Point to Multipoint Communication Techniques," filed Mar. 10, 2016, assigned to the assignee hereof.

BACKGROUND

The following relates generally to wireless communication and more specifically to low latency point to multipoint (PTM) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. In some deployments, a base station may transmit unicast transmissions that are intended for reception by a single UE, and also may transmit broadcast or multicast transmissions that are intended for reception by two or more UEs. Broadcast or multicast transmissions may also be referred to as point-to-multipoint (PTM) transmissions.

In some cases, a wireless device may be configured for low latency communications. That is, the device may communicate with using a transmission time interval (TTI) that is shorter in duration relative to other TTIs in the system, which may reduce the time between transmissions. In some situations, data rates between a base station and a UE may be constrained based on a latency of transmissions. In some cases, such as if a quality of service of the related data traffic of the transmissions is high, it may be desirable to have higher data rates for certain traffic relative to other data traffic. Additionally, in some examples base stations and UEs may communicate using contention-based techniques on a shared radio frequency spectrum band, and transmissions with shorter duration TTIs transmitted to multiple UEs may enhance operations of such systems.

SUMMARY

The described techniques relate to improved methods, systems, devices, or apparatuses that support low latency point to multipoint (PTM) communications. A base station may allocate a first set of wireless resources for PTM transmissions with a first user equipment (UE) and a second UE, and may allocate a second set of wireless resources for unicast transmissions to the first UE. The PTM transmissions may be associated with a first transmission time interval (TTI) duration that is shorter than a second TTI duration associated with the unicast transmissions. In some examples, different sets of PTM resources may be allocated for different PTM transmissions having different TTI durations. Likewise, different unicast resources may be allocated for different unicast transmissions having different TTI durations.

The allocation of wireless resources may be transmitted by the base station in one or more control channel transmissions, for example, which may be received at the first UE and the second UE. The first UE and the second UE may receive the one or more control channel transmissions and identify a first TTI duration and a second TTI duration. The first UE and the second UE also may determine whether PTM transmissions, unicast transmissions, or combinations thereof, are to be received based at least in part on the one or more control channel transmissions. In some examples, the base station may assign the first UE and the second UE to a group identification, and the PTM transmissions may have an associated group indication that the first UE and the second UE may use to determine if the PTM transmissions are to be received. In some examples, the first UE is to receive unicast transmissions, and the first UE may determine the second set of wireless resources based at least in part on the control channel transmissions.

In some examples, the first TTI duration may be dynamically indicated, or may be semi-statically indicated. In some examples, a TTI having the first TTI duration may be selected to align with boundaries of a TTI having the second TTI duration or to be within boundaries of a TTI having the second TTI duration. In certain examples, a discontinuous reception (DRX) configuration of a UE may be selected for the first TTI duration separately from a DRX configuration associated with the second TTI duration. In some examples, a base station may prioritize the first set of transmissions ahead of the second set of transmissions such that data associated with the first set of transmissions is transmitted concurrently with or ahead of data associated with the second set of transmissions.

A method of wireless communication is described. The method may include receiving, at a first UE, a first control channel transmission that allocates a first set of wireless resources for a first set of transmissions intended for two or more UEs and a second control channel transmission that allocates a second set of wireless resources for a second set of transmissions intended for the first UE. The method may further include identifying a first TTI duration for reception of the first set of transmissions, and a second TTI duration for reception of the second set of transmissions intended for the first UE. The second TTI duration may be longer than the first TTI duration. The method may further include determining that the first set of transmissions is to be received at the first UE based at least in part on reception of the first control channel transmission, and receiving, responsive to the determining, the first set of transmissions using the first set of wireless resources. The first set of wireless resources may be configured with the first TTI duration.

An apparatus for wireless communication is described. The apparatus may include means for receiving, at a first UE, a first control channel transmission that allocates a first set of wireless resources for a first set of transmissions intended for two or more UEs and a second control channel transmission that allocates a second set of wireless resources for a second set of transmissions intended for the first UE. The apparatus may further include means for identifying a first TTI duration for reception of the first set of transmissions, and a second TTI duration for reception of the second set of transmissions intended for the first UE. The second TTI duration may be longer than the first TTI duration. The apparatus may further include means for determining that the first set of transmissions is to be received at the first UE based at least in part on reception of the first control channel transmission, and means for receiving, responsive to the determining, the first set of transmissions using the first set of wireless resources. The first set of wireless resources may be configured with the first TTI duration.

Another apparatus for wireless communication is described. The apparatus may include a processor, memory in electronic communication with the processor, and instructions stored in the memory. The instructions may be operable, when executed by the processor, to cause the apparatus to receive, at a first UE, a first control channel transmission that allocates a first set of wireless resources for a first set of transmissions intended for two or more UEs and a second control channel transmission that allocates a second set of wireless resources for a second set of transmissions intended for the first UE. The instructions may be further operable to identify a first TTI duration for reception of the first set of transmissions, and a second TTI duration for reception of the second set of transmissions intended for the first UE. The second TTI duration may be longer than the first TTI duration. The instructions may be further operable to determine that the first set of transmissions is to be received at the first UE based at least in part on reception of the first control channel transmission, and receive, responsive to the determining, the first set of transmissions using the first set of wireless resources. The first set of wireless resources may be configured with the first TTI duration.

A non-transitory computer readable medium for wireless communication is described. The non-transitory computer-readable medium may include instructions to cause a processor to receive, at a first UE, a first control channel transmission that allocates a first set of wireless resources for a first set of transmissions intended for two or more UEs and a second control channel transmission that allocates a second set of wireless resources for a second set of transmissions intended for the first UE. The non-transitory computer-readable medium may include further instructions to cause the processor to receive identify a first TTI duration for reception of the first set of transmissions, and a second TTI duration for reception of the second set of transmissions intended for the first UE. The second TTI duration may be longer than the first TTI duration. The non-transitory computer-readable medium may include further instructions to cause the processor to determine that the first set of transmissions is to be received at the first UE based at least in part on reception of the first control channel transmission, and receive, responsive to the determining, the first set of transmissions using the first set of wireless resources. The first set of wireless resources may be configured with the first TTI duration.

In some examples of the method, apparatuses, or non-transitory computer-readable medium, the first control channel transmission may include one or more of scheduling information for the first set of transmissions or monitoring durations for monitoring subsequent control channel transmissions.

In some examples of the method, apparatuses, or non-transitory computer-readable medium, receiving the first set of transmissions may include operations, features, means, or instructions for receiving a traffic channel identified by the first set of wireless resources. In some examples, the traffic channel may include a portion of a physical downlink shared channel (PDSCH) used for the second set of transmissions.

In some examples of the method, apparatuses, or non-transitory computer-readable medium, identifying the first TTI duration and the second TTI duration may include operations, features, means, or instructions for determining that the second TTI duration corresponds to a duration of a subframe of a radio frame and the first TTI duration corresponds to a portion of the duration of the subframe. In some examples, the subframe may include two or more orthogonal frequency division multiplexing (OFDM) symbol periods, and the first TTI duration may correspond to one or more of the OFDM symbol periods. In some examples, the subframe may include a set of TTIs having the first TTI duration, and the first set of transmissions may be transmitted in a same first TTI location within different subframes.

In some examples of the method, apparatuses, or non-transitory computer-readable medium, the first UE may have a first group identification, and determining that the first set of transmissions is to be received at the first UE may be based at least in part on the first group identification and a group indication associated with the first set of transmissions. In some examples, the first group identification may be associated with a first broadcast service, and the method, apparatus, or non-transitory computer-readable medium may include operations, features, means, or instructions for identifying a second group identification of the first UE that is associated with a second service, and determining that a third set of transmissions, intended for two or more UEs and associated with the second service, are to be received at the first UE based at least in part on the second group identification and a second group indication associated with the third set of transmissions. In some examples, the third set of transmissions may use the first TTI duration, and the method, apparatus, or non-transitory computer-readable medium may include operations, features, means, or instructions for receiving the third set of transmissions using a set of wireless resources configured with the first TTI duration. In some examples, the first set of transmissions may be transmitted in a first slot of a subframe, and the third set of transmissions may be transmitted in a second slot of the subframe. The first slot and the second slot may have the first TTI duration. Some examples may include operations, features, means, or instructions for identifying, at the first UE, a third TTI duration for receiving the third set of transmissions, and receiving the third set of transmissions using a set of wireless resources configured with the third TTI duration.

In some examples of the method, apparatuses, or non-transitory computer-readable medium, the first control channel transmission may indicate the first TTI duration. In some examples, the indication of the first TTI duration may be received dynamically in an indication of downlink wireless resources that include the first set of transmissions. In some examples, the indication of the first TTI duration may be received semi-statically in a system information block (SIB) that configures one or more parameters associated with the first set of transmissions.

In some examples of the method, apparatuses, or non-transitory computer-readable medium, the first TTI duration may correspond with a duration of a low latency TTI for receiving a set of unicast transmissions transmitted to the first UE.

Some examples of the method, apparatuses, or non-transitory computer-readable medium may include operations, features, means, or instructions for configuring one or more first TTI DRX parameters separately from one or more second TTI DRX parameters. In some examples, configuring one or more first TTI DRX parameters separately from one or more second TTI DRX parameters may include operations, features, means, or instructions for one or more of: discontinuing DRX when it is determined that the first set of transmissions are to be received at the first UE, setting the one or more first TTI DRX parameters based at least in part on a traffic type of the first set of transmissions, or setting a first TTI DRX periodicity or offset based on the second TTI duration and setting a first TTI DRX on-duration based on the first TTI duration.

Some examples of the method, apparatuses, or non-transitory computer-readable medium may include operations, features, means, or instructions for determining that a unicast transmission is configured to be transmitted concurrently with the first set of transmissions, and determining whether the first set of transmissions are received at the first UE concurrently with the unicast transmission.

In some examples of the method, apparatuses, or non-transitory computer-readable medium, determining whether the first set of transmissions are received at the first UE concurrently with the unicast transmission may include operations, features, means, or instructions for blindly detecting that the unicast transmission and the first set of transmissions are concurrently received. In some examples, blindly detecting may include operations, features, means, or instructions for comparing a received power over two of more TTIs having the first TTI duration. In some examples, blindly detecting may include operations, features, means, or instructions for receiving a control channel indication that the first set of transmissions are to be transmitted concurrently with the unicast transmission.

In some examples of the method, apparatuses, or non-transitory computer-readable medium, a unicast transmission may be rate matched around the first set of transmissions. In some examples, the first set of transmissions may be scheduled in wireless resources that puncture wireless resources scheduled for a unicast transmission, and the method, apparatus, or non-transitory computer-readable medium may include operations, features, means, or instructions for performing interference cancellation on the received first set of transmissions. In some examples, the first set of transmissions may be rate matched around one or more reference signals associated with a unicast transmission.

A method of wireless communication is described. The method may include identifying a first TTI duration for transmitting a first set of transmissions to at least a first UE and a second UE, and a second TTI duration for transmitting a second set of transmissions to one or more UEs. The second TTI duration may be longer than the first TTI duration. The method may further include determining that the first UE and the second UE are to receive the first set of transmissions, transmitting the first set of transmissions to the first UE and the second UE using a first set of wireless resources configured with the first TTI duration, and transmitting the second set of transmissions using a second set of wireless resources configured with the second TTI duration.

An apparatus for wireless communication is described. The apparatus may include means for identifying a first TTI duration for transmitting a first set of transmissions to at least a first UE and a second UE, and a second TTI duration for transmitting a second set of transmissions to one or more UEs, means for determining that the first UE and the second UE are to receive the first set of transmissions, means for transmitting the first set of transmissions to the first UE and the second UE using a first set of wireless resources configured with the first TTI, and means for transmitting the second set of transmissions using a second set of wireless resources configured with the second TTI. The second TTI duration may be longer than the first TTI duration.

Another apparatus is described. The apparatus may include a processor, memory in electronic communication with the processor, and instructions stored in the memory. The instructions may be operable, when executed by the processor, to cause the apparatus to identify a first TTI duration for transmitting a first set of transmissions to at least a first UE and a second UE, and a second TTI duration for transmitting a second set of transmissions to one or more UEs. The second TTI duration may be longer than the first TTI duration. The instructions may be further operable to cause the apparatus to determine that the first UE and the second UE are to receive the first set of transmissions, transmit the first set of transmissions to the first UE and the second UE using a first set of wireless resources configured with the first TTI duration, and transmit the second set of transmissions using a second set of wireless resources configured with the second TTI duration.

A non-transitory computer readable medium for wireless communication is described. The non-transitory computer-readable medium may include instructions to cause a processor to identify a first TTI duration for transmitting a first set of transmissions to at least a first UE and a second UE, and a second TTI duration for transmitting a second set of transmissions to one or more UEs. The second TTI duration may be longer than the first TTI duration. The non-transitory computer-readable medium may further include instructions to cause a processor to determine that the first UE and the second UE are to receive the first set of transmissions, transmit the first set of transmissions to the first UE and the second UE using a first set of wireless resources configured with the first TTI duration, and transmit the second set of transmissions using a second set of wireless resources configured with the second TTI duration.

Some examples of the method, apparatuses, or non-transitory computer-readable medium may include operations, features, means, or instructions for allocating the first set of wireless resources for the first set of transmissions and allocating the second set of wireless resources for the second set of transmissions, such that the first set of wireless resources includes a subset of the second set of wireless resources.

Some examples of the method, apparatuses, or non-transitory computer-readable medium may include operations, features, means, or instructions for transmitting, to the first UE and the second UE, the allocation of the first set of wireless resources in a first control channel transmission and the second set of wireless resources in a second control channel transmission. In some examples, the first control channel transmission may include one or more of scheduling information for the first set of transmissions or monitoring durations for monitoring subsequent control channel transmissions. In some examples, the first set of wireless resources may include a traffic channel within a PDSCH used for the second set of transmissions.

In some examples of the method, apparatuses, or non-transitory computer-readable medium, the second TTI duration may correspond to a duration of a subframe of a radio frame and the first TTI duration may correspond to a portion of the duration of the subframe. In some examples, the subframe may include two or more OFDM symbol periods and the first TTI duration may correspond to one or more of the OFDM symbol periods. In some examples, the subframe may include a set of TTIs having the first TTI duration and the first set of transmissions may be transmitted in a same first TTI location within different subframes.

In some examples of the method, apparatuses, or non-transitory computer-readable medium, identifying that the first UE and the second UE are to receive the first set of transmissions may include operations, features, means, or instructions for configuring the first UE and the second UE with a first group identification. In some examples, the first group identification may be associated with a first broadcast service, and the method, apparatus, or non-transitory computer-readable medium may include operations, features, means, or instructions for configuring the first UE and at least one other UE with a second group identification that is associated with a second service, and transmitting a third set of transmissions of the second service to the first UE and the at least one other UE. In some examples, the third set of transmissions may use the first TTI duration. In some examples, the first set of transmissions may be transmitted in a first slot of one or more subframes, and the third set of transmissions may be transmitted in a second slot of the one or more subframes. The first slot and the second slot may both have first TTI duration. In some examples, the third set of transmissions may use a third TTI duration that is shorter than the second TTI duration.

Some examples of the method, apparatuses, or non-transitory computer-readable medium may include operations, features, means, or instructions for transmitting a control channel transmission that indicates the first TTI duration. In some examples, the indication of the first TTI duration may be transmitted dynamically in an indication of downlink wireless resources that include the first set of transmissions. In some examples, the indication of the first TTI duration may be transmitted semi-statically in a SIB that configures one or more parameters associated with the first set of transmissions.

In some examples of the method, apparatuses, or non-transitory computer-readable medium, the first TTI duration may correspond with a duration of a low latency TTI for a set of unicast transmissions transmitted to the first UE.

Some examples of the method, apparatuses, or non-transitory computer-readable medium may include operations, features, means, or instructions for configuring one or more first TTI DRX parameters separately from one or more second TTI DRX parameters, and transmitting the one or more first TTI DRX parameters and the one or more second TTI DRX parameters to the first UE and the second UE. In some examples, configuring the first TTI DRX parameters separately from the second TTI DRX parameters may include operations, features, means, or instructions for one or more of: discontinuing DRX when it is determined that the first set of transmissions are to be received at the first UE, setting the one or more first TTI DRX parameters based at least in part on a traffic type of the first set of transmissions, or setting a first TTI DRX periodicity or offset based on the second TTI duration and setting a first TTI DRX on-duration based on the first TTI duration.

Some examples of the method, apparatuses, or non-transitory computer-readable medium may include operations, features, means, or instructions for determining that a unicast transmission is to be transmitted concurrently with transmissions of the first set of transmissions, and prioritizing the first set of transmissions over the unicast transmission. Some examples may include operations, features, means, or instructions for transmitting an indication that the first set of transmissions are transmitted concurrently with the unicast transmission. Some examples may include operations, features, means, or instructions for rate matching the unicast transmission around the first set of transmissions. Some examples may include operations, features, means, or instructions for rate matching the first set of transmissions around one or more reference signals of the unicast transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
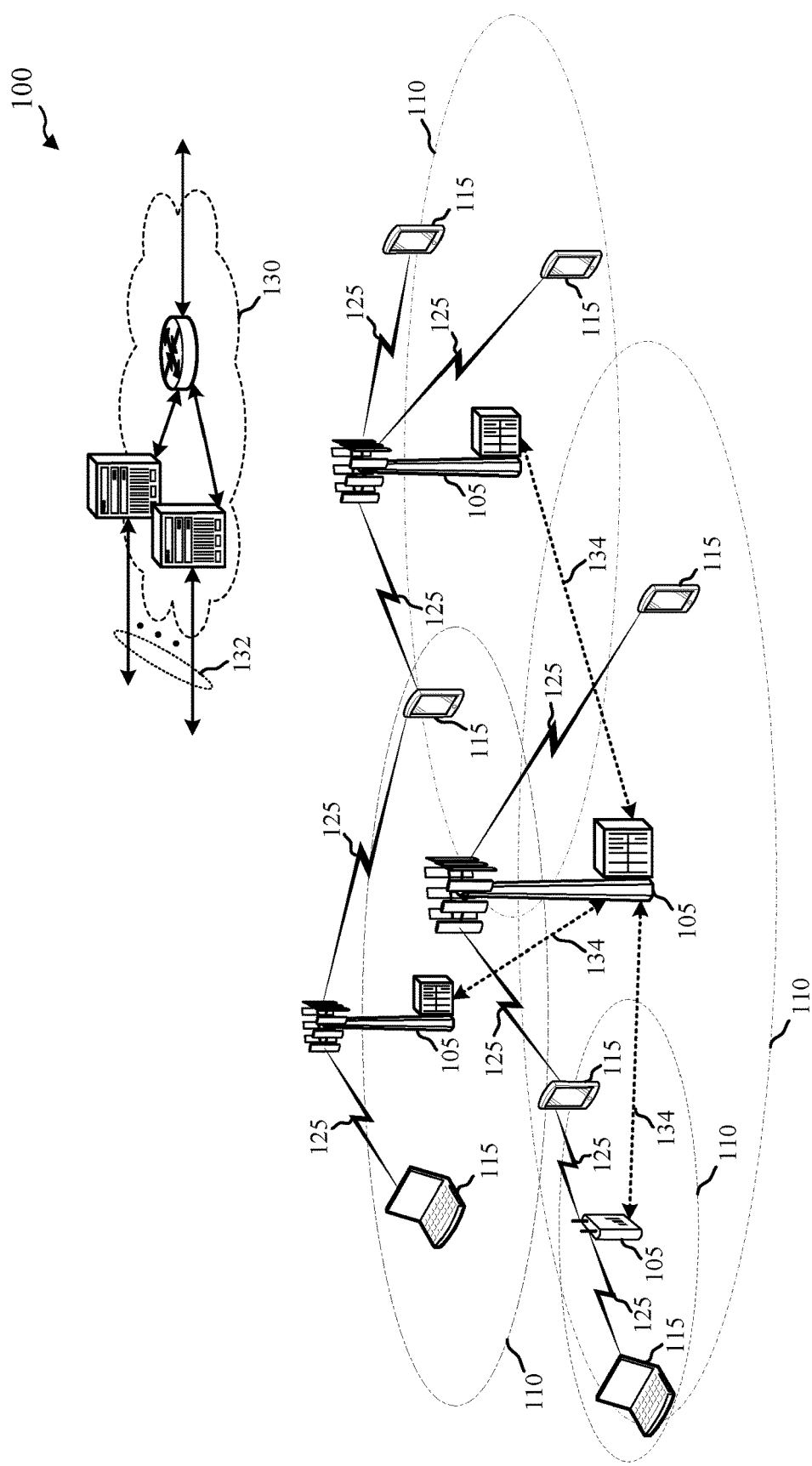
FIG. 1 illustrates an example of a wireless communications system that supports low latency PTM communication in accordance with aspects of the present disclosure.

Various aspects of the present disclosure provide techniques for point to multipoint (PTM) communications in a system supporting communications using multiple different transmission time interval (TTI) durations. In some examples, low latency PTM communications may be provided that use a shortened or reduced-duration TTI relative to other transmissions in the system. The low latency PTM communications may be supported by one or more physical channels that support PTM communications according to shortened TTI durations (e.g., using shortened TTIs (sTTIs)). In some examples, a base station may allocate, in a PTM traffic channel, a first set of wireless resources for PTM transmissions with a first user equipment (UE) and a second UE, and may allocate a second set of wireless resources (e.g., in a physical downlink shared channel (PDSCH)) for unicast transmissions to the first UE. The PTM transmissions may have a first transmission time interval (TTI) that is shorter than a second TTI of the unicast transmissions. In some examples, different sets of PTM resources may be allocated for different PTM transmissions having different TTI durations. Likewise, different unicast resources may be allocated for different unicast transmissions having different TTI durations.

The allocation of wireless resources may be transmitted by the base station in one or more control channel transmissions (e.g., in a PTM control channel), which may be received at the first UE and the second UE. The first UE and the second UE may receive the control channel transmissions and identify the first TTI duration and the second TTI duration. The first UE and the second UE also may determine whether PTM transmissions, unicast transmissions, or combinations thereof, are to be received based at least in part on the PTM control channel transmissions and/or one or more other control channel transmissions (e.g., a physical downlink control channel (PDCCH) transmission associated with the unicast transmission). In some examples, the base station may assign the first UE and the second UE to a group identification, and the PTM transmissions may have an associated group indication that the first UE and the second UE may use to determine if the PTM transmissions are to be received. In some examples, the first UE is to receive unicast transmissions, and the first UE may determine the second set of wireless resources bases at least in part on the control channel transmissions.

In some examples, the first TTI duration may be dynamically indicated, or may be semi-statically indicated. In some examples, the first TTI duration may be selected to align with boundaries of the second TTI duration or to be within boundaries of the second TTI duration. In certain examples, a discontinuous reception (DRX) configuration of a UE may be selected for the first TTI duration separately from a DRX configuration associated with the second TTI duration. In some examples, a base station may prioritize the first set of transmissions ahead of the second set of transmissions such that data associated with the first set of transmissions is transmitted concurrently with or ahead of data associated with the second set of transmissions.

Such low latency PTM transmissions may provide enhanced system performance in some examples, such as through latency reduction, concurrent data transmission to multiple receiving UEs, or combinations thereof. Reduced latency may provide enhanced operation through a reduced time associated with the reception of a transmission, acknowledgment of successful or unsuccessful reception, and an associated retransmission as necessary. A particular group of UEs may, for example, be associated with a latency-sensitive application, such as a vehicle communication system, a gaming application, or other implementation that is relatively delay intolerant. In the event that data is to be transmitted to the group of UEs, low latency PTM transmissions may allow the data to be transmitted in an efficient manner to the group of UEs.

Furthermore, in some examples, UEs and base stations may communicate using contention-based communications in a shared radio frequency spectrum band. PTM transmissions in such examples may allow a base station to transmit data to a set of UEs without having to separately win contention of the shared radio frequency spectrum band for separate transmissions to each UE in the set of UEs. PTM transmissions, in either a dedicated radio frequency spectrum band or a shared radio frequency spectrum band, may be transmitted by a particular base station, and may be referred to as single-cell point-to-multipoint (SC-PTM) communications. In some examples, low latency SC-PTM communications may be referred to as ultra low latency SC-PTM (uSC-PTM) communications or shortened TTI SC-PTM (sSC-PTM) communications.

Aspects of the disclosure introduced above are described below in the context of a wireless communication system. Such a wireless communication system may include a base station and a UE that support low latency applications and PTM operations as described herein. Aspects of the disclosure are further illustrated by and described with reference to apparatus diagrams, system diagrams, and flowcharts that relate to low latency point to multipoint communications.

FIG. 1 illustrates an example of a wireless communications system 100 that supports low latency PTM communication in accordance with aspects of the present disclosure. The wireless communications system 100 includes base stations 105, UEs 115, and a core network 130. In some examples, the wireless communications system 100 may be a Long Term Evolution (LTE) network and/or a LTE-Advanced (LTE-A) network. The wireless communications system 100 may support low latency applications, operations according to multiple TTI durations, and point to multipoint (PTM) operations as described in the present disclosure. In some examples, PTM operations may use shortened TTIs in a manner similar to other low latency applications.

The base stations 105 may wirelessly communicate with the UEs 115 via at least one base station antenna. Each of the base stations 105 may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro or small cell base stations). There may be overlapping geographic coverage areas 110 for different technologies.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, an Internet of things (IoT) device, an Internet of Everything (IoE) device, a machine type communication (MTC) device, an appliance, an automobile, etc. A UE 115 may be able to communicate with various types of network access devices and network equipment, including macro eNBs, small cell eNBs, relay base stations, and the like. A UE may also be able to communicate using different radio access technologies (RATs), such as a cellular RAT (e.g., a LTE/LTE-A RAT), a Wi-Fi RAT, or other RATs.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like.

Data communications within wireless communications system 100 may be divided into and described with reference to logical channels, transport channels, and physical (PHY) layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH), for multicast data.

DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data.

DL PHY channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data.

In some examples, PTM communications between a base station 105 and multiple UEs 115 may use low latency PTM communications that may be supported by one or more physical channels such as a single-cell multicast control channel (SC-MCCH) or a single cell multicast traffic channel (SC-MTCH) that support PTM communications at shortened TTI durations. In some examples, the SC-MCCH and the SC-MTCH may be mapped to PDSCH resources. UL PHY channels may include physical random access channel (PRACH) for access messages, physical uplink control channel (PUCCH) for control data, and physical uplink shared channel (PUSCH) for user data.

PDCCH carries downlink control information (DCI) in at least one control channel element (CCE). DCI includes information regarding DL scheduling assignments, UL resource grants, transmission scheme, UL power control, hybrid automatic repeat request (HARQ) information, modulation and coding scheme (MCS) and other information. The size and format of the DCI messages can differ depending on the type and amount of information that is carried by the DCI.

PDCCH can carry DCI messages associated with multiple users, and each UE 115 may decode the DCI messages that are intended for it. For example, each UE 115 may be assigned a cell radio network temporary identifier (C-RNTI) and cyclic redundancy check (CRC) bits attached to each DCI may be scrambled based on the C-RNTI. To reduce power consumption and overhead at the UE, a limited set of CCE locations can be specified for DCI associated with a specific UE 115. CCEs may be grouped (e.g., in groups of 1, 2, 4 and 8 CCEs), and a set of CCE locations in which the UE may find relevant DCI may be specified. A UE 115 may attempt to decode DCI by performing a process known as a blind decode. Multi-TTI scheduling (e.g., a multi-TTI grant) may be transmitted using PDCCH, and such scheduling may be UE-specific. In some cases, a control portion of a low latency TTI may include a low latency PDCCH (e.g., a shortened-TTI PDCCH (sPDCCH) or an ultra low latency PDCCH (uPDCCH)), which may include a multi- or individual-TTI grant.

Time intervals for communication within wireless communications system 100 may be expressed in multiples of a basic time unit (e.g., the sampling period, Ts=1/30,720,000 seconds). Time resources may be organized according to radio frames of duration of 10 milliseconds (Tf=307200*Ts), which may be identified by a system frame number (SFN) ranging from 0 to 1023. Each frame may include ten subframes numbered from 0 to 9, each having a duration of 1 millisecond. A subframe may be further divided into two 0.5 millisecond slots, each of which contains two or more modulation symbol periods (depending on the duration of the cyclic prefix (CP) prepended to each symbol). Excluding the CP, each symbol contains 2048 sample periods. In some cases the subframe may be the smallest scheduling unit, where the smallest scheduling unit may also be referred to as a TTI. But the wireless communications system 100 may support TTIs having a duration of one subframe as well as shorter duration, which may be referred to as low latency TTIs, which may have a duration of less than one LTE subframe (e.g., one symbol period, two symbol periods, one slot, etc.). In various examples, wireless communications system 100 may support two or more TTI durations—including a first duration that is at least two LTE symbol periods in duration, and a second duration that is less than the first duration.

Within wireless communications system 100, short duration TTIs may be fixed in duration and may have a duration corresponding to a single transport block (TB). A TB may refer to a unit of data passed between logical layers of a communications system. For example, the TB may refer to a unit of data passed between the medium access control (MAC) and PHY layers and may include data and header information for various logical layers of the communication system (e.g., RLC, MAC, etc.). By way of example, a TB may span the duration of one low latency TTI. So a determination of a number of scheduled TBs may indicate a number of scheduled low latency TTIs.

A base station 105 may insert periodic pilot symbols such as cell-specific reference signals (CRSs) to aid UEs 115 in channel estimation and coherent demodulation, and thus communication with wireless communications system 100. A CRS may include one of 504 different cell identities, for instance. A CRS may be modulated using quadrature phase shift keying (QPSK) and power boosted (e.g., transmitted at 6 dB higher than the surrounding data elements) to make them resilient to noise and interference. CRS may be embedded in 4 to 16 resource elements (REs) in each resource block (RB) based on the number of antenna ports or layers (up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted on RBs assigned to that UEs 115. A determination of low latency TTI parameters may be based on, or may depend, on whether CRS is present in a symbol.

Wireless communications system 100 may employ HARQ, a method of increasing the likelihood that data is received correctly over a wireless communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., poor signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response, and retransmission may be referred to as a HARQ process. In some cases, a limited number of HARQ processes may be used for a given communication link 125.

In some examples, HARQ processes may be performed at a transport block level, in which the entire transport block is retransmitted when a NACK is received by the transmitter. In a multi-TTI assignment, separate indicators for new data may be used for each TB in the assignment. Or, in some examples, a single new data indicator may be used for all TBs of the assignment. In other cases, multi-TTI scheduling may be used for new transmissions only, such that retransmission may, in some examples, be limited to individual assignments.

In some examples, a transport block may be divided into one or more code blocks and HARQ processes may be performed at a code block level where one or more code blocks (e.g., the one or more code blocks that were unsuccessfully decoded by the receiver) are retransmitted when a NACK is received by the transmitter. The threshold for code block level HARQ processes for low latency TTIs may be different from longer duration TTIs (e.g., it might be different than 6144 bits, as is in LTE).

In some cases, wireless communications system 100 may utilize one or more enhanced component carrier (eCCs). An eCC may be characterized by one or more features including: flexible bandwidth, different TTI durations, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator may use the spectrum according to contention-based access techniques). An eCC characterized by flexible bandwidth may include one or more segments that may be utilized by UEs 115 that may not be capable of monitoring the whole bandwidth or prefer to use a limited bandwidth (e.g., to conserve power).

In some cases, an eCC may utilize a different TTI duration than other CCs, which may include use of a reduced or variable symbol period as compared with TTI durations of the other CCs. In some cases, PTM transmissions may utilize reduced or variable symbol period TTIs. The symbol period may remain the same, in some cases, but each symbol period may represent a distinct TTI. In some examples, an eCC may support transmissions using different TTI durations, and a parameter of a shorter duration TTI of the eCC may be determined with reference to resources of a longer duration TTI within wireless communications system 100.

Figure 2:
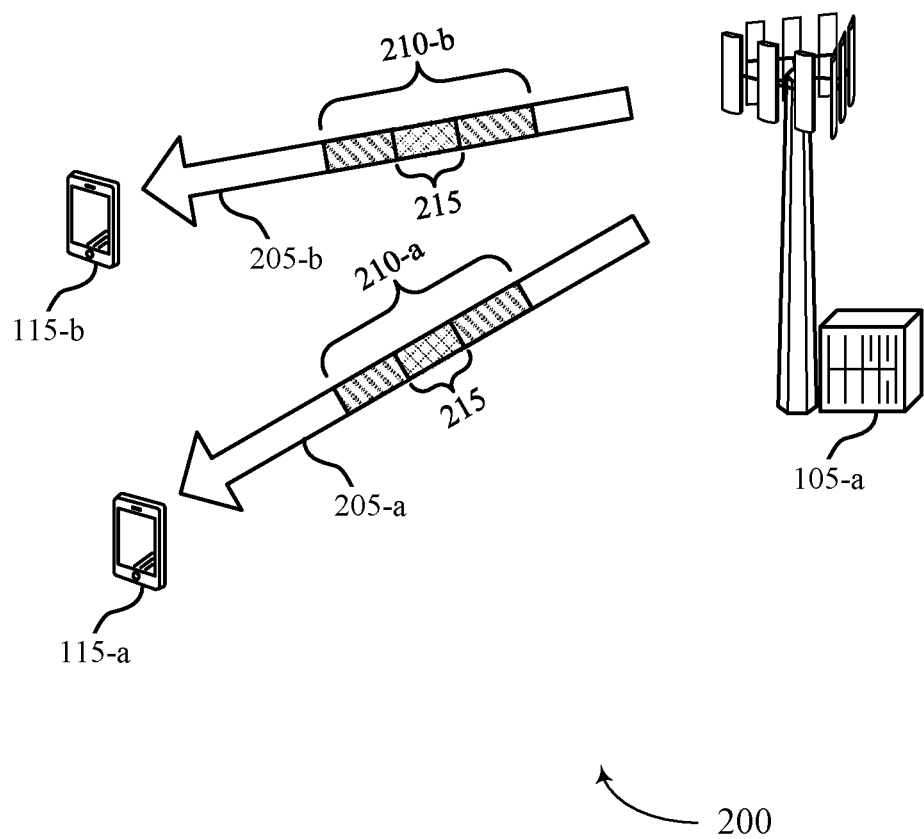
FIG. 2 illustrates an example of a wireless communications system that supports low latency PTM communication in accordance with aspects of the present disclosure.

FIG. 2 illustrates an example of a wireless communications system 200 that supports low latency PTM communication in accordance with aspects of the present disclosure. Wireless communications system 200 may include base station 105-a, a first UE 115-a, and a second UE 115-b, which may be examples of the corresponding devices described with reference to FIG. 1. Base station 105-a may communicate with UE 115-a via communications link 205-a and with UE 115-b via communications link 205-b.

As described above, a frame structure may be used within the wireless communications system 200 to organize physical resources. A frame, for example, may be a 10 millisecond duration that may be further divided into 10 equally sized subframes or TTIs. Each subframe may include two consecutive time slots. Each slot may include 6 or 7 OFDMA symbol periods. A resource element (RE) may span one symbol period in the time domain and one subcarrier (e.g., a 15 KHz frequency range) in the frequency domain. A resource block (RB) may contain 12 consecutive subcarriers in the frequency domain and, for a normal cyclic prefix in each OFDM symbol, 7 consecutive OFDM symbol periods in 1 slot (84 resource elements) in the time domain. The number of bits carried by each resource element may depend on the modulation scheme (the configuration of symbols that may be selected during each symbol period). Thus, the more resource blocks that a UE receives and the higher the modulation scheme, the higher the data rate may be for the UE. Further details of TTIs and TTI durations that may be utilized by wireless communications system 200 are illustrated by and described with reference to FIGS. 3-5.

In some cases, communications link 205-a may include a fixed duration TTI 210-a, which may correspond to a LTE subframe, and may include a low latency PTM transmission 215. Similarly, communications link 205-b may include a fixed duration TTI 210-b, which may also correspond to a LTE subframe, and also may include the low latency PTM transmission 215. A TTI of the low latency PTM transmissions 215 may have a duration shorter than fixed duration TTI 210-a or fixed duration TTI 210-b. The TTI duration of the low latency PTM transmissions 215 may be, for example, a duration of a single slot, a duration of two OFDM symbol periods, or a duration of a single OFDM symbol period. In some examples, the low latency PTM transmissions 215 may include PTM transmissions of two or more different services, and each service may have a different TTI duration. In some cases, the TTI duration of the low latency PTM transmissions 215 may be dynamically selected and indicated to UEs 115, which may then discern a number of TTIs that are scheduled. In some examples, communications links 205 may also include one or more unicast transmissions that use low latency TTIs.

The low latency PTM transmissions 215 having shortened TTI durations may be employed for latency sensitive services, for example. In some cases, using shorter duration TTIs may reduce over-the-air latency. For example, shorter duration TTIs of the low latency PTM transmissions 215 (e.g., on the order of an OFDM symbol period, two OFDM symbol periods, one slot, etc.) may help reduce HARQ latency as compared with non-low latency TTIs (e.g., a LTE subframe).

In some cases, TTI duration (e.g., number of symbol periods within the TTI) for low latency PTM transmissions 215 may by dynamically indicated for different data services. For example, a low latency control channel may schedule wireless resources for each PTM service by varying the number of symbol periods of the TTI (e.g., varying TTI duration). Dynamic TTI duration indication may be employed in wireless communications system 200 in certain scenarios, while multi-TTI scheduling (e.g., scheduling multiple, fixed duration low latency TTIs in a semi-persistent manner) may be employed in other scenarios.

In some examples, low latency PTM transmissions 215 may multicast identical content to first UE 115-a and second UE 115-b (or one or more other UEs), through the PDSCH in a single cell, and may use a single-cell multicast control channel (SC-MCCH) and a single cell multicast traffic channel (SC-MTCH). In some cases, SC-MCCH and SC-MTCH may be mapped to a downlink shared channel and use PDSCH resources. SC-MCCH and SC-MTCH transmissions may each be indicated in a physical downlink control channel (PDCCH) by specific radio network temporary identifiers (RNTIs), such as a single cell RNTI (SC-RNTI) for the SC-MCCH and a group RNTI (G-RNTI) for the SC-MTCH.

In some examples, a system information block (SIB) may be transmitted by the base station (e.g., a SIB 20 on a PBCH transmission) that may indicate wireless resources, in the time domain, where the SC-MCCH can be found, and in certain examples may include an indication of a SC-MCCH modification period, a SC-MCCH repetition period, and a SC-MCCH subframe offset. Such a SIB also may include MCCH configuration information such as a list of multicast services to be supported over low latency PTM. For each of the multicast services, the SIB may include a temporary mobile group identity (TMGI) and optional session ID, a group RNTI (G-RNTI), and a transmission mode (e.g., TM1 or TM2) for the associated PTM transmissions. The SC-RNTI may be used to identify the PDCCH that conveys the scheduling information for SC-MCCH, in some examples.

For each SC-MTCH (e.g., for each multicast service), the associated SC-MCCH may identify a SC-MTCH scheduling cycle, which may be defined by the length and a start offset; a SC-MTCH on-duration, which may be defined as a first duration, in terms of the multiples of the fixed duration TTIs, that a UE 115 waits to receive PDCCH after waking up from SC-PTM scheduling DRX (if a UE successfully decodes a PDCCH indicating wireless resources allocated to this SC-MTCH, then the UE stays awake and starts an inactivity timer); and a SC-MTCH inactivity timer, which is defined as a second duration, in terms of the fixed duration TTIs, that a UE waits after successfully decoding a PDCCH to successfully decode another PDCCH, with the UE entering DRX mode if decoding is not completed within the second duration. In some examples, DRX modes and timing for low latency PTM transmissions are independent of DRX modes associated with fixed duration TTIs or other unicast transmissions.

Thus, a UE 115, in some examples, may decode system information (e.g., via a SIB 20 transmission), and identify information regarding the presence of SC-MCCH over the time domain in certain identified subframes. In the identified subframes, using SC-RNTI over the PDCCH, the UE 115 may obtain the RB allocation of the SC-MCCH for a multicast service that is to be received, and may identify the associated TMGI, G-RNTI, SC-PTM scheduling DRX, and adjacent cell information. Using the identified G-RNTI, over the PDCCH of the subframes indicated by the SC-PTM scheduling DRX, the resource allocation information for a given SC-MTCH may be identified.

In some examples, multicast services that use both fixed duration or subframe duration TTIs and that use shortened duration TTIs may be provided by base station 105-a. In such cases, SC-PTM services that use fixed duration or subframe duration TTIs may use a SC-MCCH and a SC-MTCH to convey control information and traffic, and low latency PTM (e.g., sSC-PTM or uSC-PTM) services may use a low latency SC-MCCH (e.g., a sSC-MCCH or uSC-MCCH) and a low latency SC-MTCH (e.g., a sSC-MTCH or uSC-MCCH) to convey low latency control information and traffic. In some examples, the low latency SC-MTCH may support low latency PTM services having shortened TTI durations (e.g., 1-symbol TTIs, 2-symbol TTIs, or 1-slot TTIs), and may include, for each multicast service, wireless resources that are identified by a resource indication having a service-specific G-RNTI transmitted via the PDCCH, or low latency PDCCH. The low latency SC-MCCH may, in some examples, be repeated at a relatively slow rate that is specified by the repetition and modification periods as discussed above. In some examples, both the low latency SC-MCCH and the SC-MCCH may have a same format and repetition/modification periods, or may have different formats, or repetition/modification periods.

Figure 3:
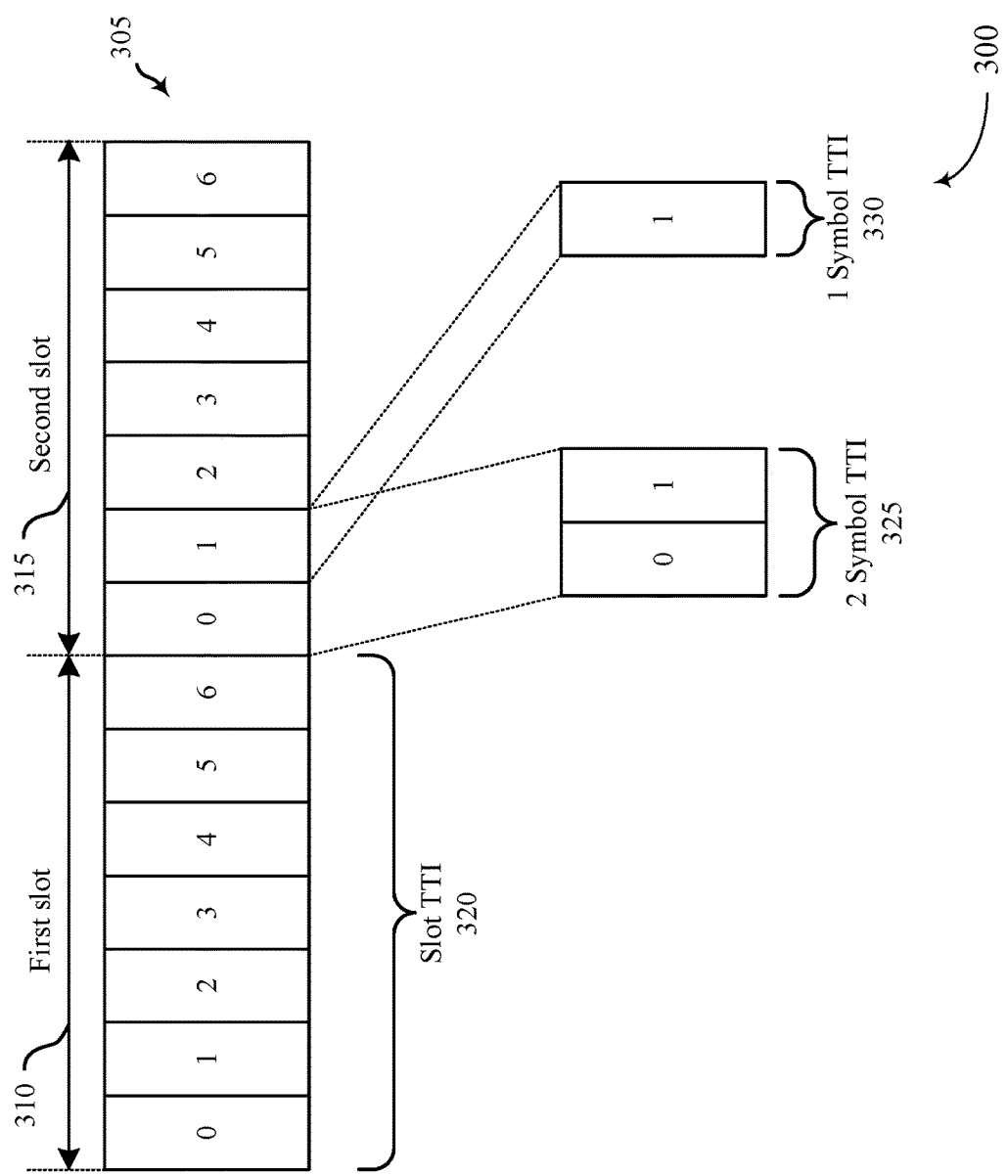
FIG. 3 illustrates an example of a wireless resources that include multiple TTI durations that support low latency PTM transmissions in accordance with aspects of the present disclosure.

FIG. 3 illustrates an example of wireless resources 300 that include multiple TTI durations that support low latency PTM transmissions in accordance with aspects of the present disclosure. In some cases, the multiple TTI durations and corresponding frame structures represent aspects of wireless resources used by a UE 115 or base station 105 as described with reference to FIGS. 1-2. In FIG. 3, subframe 305, corresponding to a legacy TTI, may include a first slot 310 and a second slot 315, and has 14 OFDM symbol periods spanning the duration of the subframe 305. Each of the first slot 310 and second slot 315 may include 7 symbol periods indexed 0 through 6, as shown in subframe 305. A low latency TTI may include a slot TTI 320, which may correspond to the first slot 310 of subframe 305, although in some examples, may correspond to the second slot 315.

In some examples, low latency TTIs may include a two-symbol TTI 325, or a one-symbol TTI 330. In some examples, a first multicast service may have slot TTIs 320 that are associated with first slot 310, and a second multicast service may have two-symbol TTIs 325, or one-symbol TTIs 330, that are associated with second slot 315. Of course, a single TTI duration for a single multicast service or various combinations of TTI durations for different multicast services may be used within configured resources of a particular subframe 305, and the example of FIG. 3 is provided for the purposes of illustration and discussion. As indicated above, different multicast services may be distinguished according to their specific G-RNTI, and a UE receiving low latency PTM communications may select or be configured for a particular service based on the traffic to be received at the UE. In some examples, multiple PTM services may be scheduled by a base station in FDM/TDM fashion over a subframe. In some cases, if two or more PTM services are supported by a UE, each of the services may be configured to have a same TTI duration (e.g., a slot TTI, a two-symbol TTI, or a one-symbol TTI). In such cases, different PTM services may be supported in different TTI opportunities in a subframe. For example, with a slot TTI, a first PTM service may be scheduled in the first slot 310, and a second PTM service may be scheduled in the second slot 315. In other examples, different PTM services may have different TTI durations in a subframe. In such examples, a base station may provide an indication of the TTI for a particular service, such as in a SIB or MCCH transmission, for example.

As indicated above, allocation of wireless resources for PTM transmissions may be made by a base station 105 and signaled to one or more UEs 115. The indication of resource allocations and TTI durations for PTM transmissions may be provided dynamically or semi-statically. In examples where configuration of PTM transmissions is semi-static, the base station may signal the TTI duration, such as a slot TTI, a two-symbol TTI, or a one-symbol TTI semi-statically, such as through periodic SIB transmissions, for example. In examples where configuration of PTM transmissions is dynamic, a base station may select a TTI on a per-subframe basis and indicate the TTI dynamically per subframe, such as in a downlink grant associated with the subframe. Such dynamic TTI selection may allow a base station to align the low latency PTM TTI duration with a TTI duration of low latency unicast transmissions of the subframe, for example.

In some examples modification of a low latency TTI duration may be performed on a per-subframe bases, and in some examples low latency TTI duration modification may be done only at subframe boundaries, in order to have low latency transmissions aligned with one or more boundaries of the longer duration TTIs of unicast transmissions, other longer duration TTI PTM transmissions, or other low latency unicast or PTM transmissions. In some examples, for a UE monitoring both unicast and PTM transmissions simultaneously on a carrier, it may be useful to align the TTIs for both transmissions. Such alignment may allow a base station to more easily partition wireless resources between the two transmission strategies and help avoid resource overlapping. For example, if low latency unicast transmissions are configured with a two-symbol TTI duration, a base station may also select a two-symbol TTI duration for low latency PTM transmissions. Furthermore, in examples where unicast TTI durations are dynamically indicated, low latency PTM transmission TTI durations may be dynamically indicated as well.

As indicated above, in some examples DRX configuration for low latency PTM transmissions may be independent from DRX configuration of unicast transmissions. For example, unicast subframe-duration TTIs may be configured in a first DRX mode, and low latency PTM transmissions may be configured to have no DRX, which may reduce latency associated with wake times of the low latency DRX cycle. Such a configuration may result in increased power consumption at the UE, and in some examples may be implemented based on a quality of service of a particular PTM service. In other examples, DRX for low latency PTM may be configured based at least in part on a traffic type of the associated PTM service. For example, for PTM services where the statistics or periodicity of data transmission is known a priori (e.g., sending a group command to a set of UEs at specific times with low delay), low latency PTM DRX scheduling may be set to provide that the UEs wake times correspond to the data transmissions. Such configurations may provide enhanced power savings relative to configurations with no DRX. In other examples, low latency PTM DRX periodicity and subframe offset configuration may be based on subframe-level TTI durations, but the DRX on-duration may be based on the shortened TTI duration of the low latency PTM transmission. Such a shortened on-duration may provide reduced power consumption.

Figure 4:
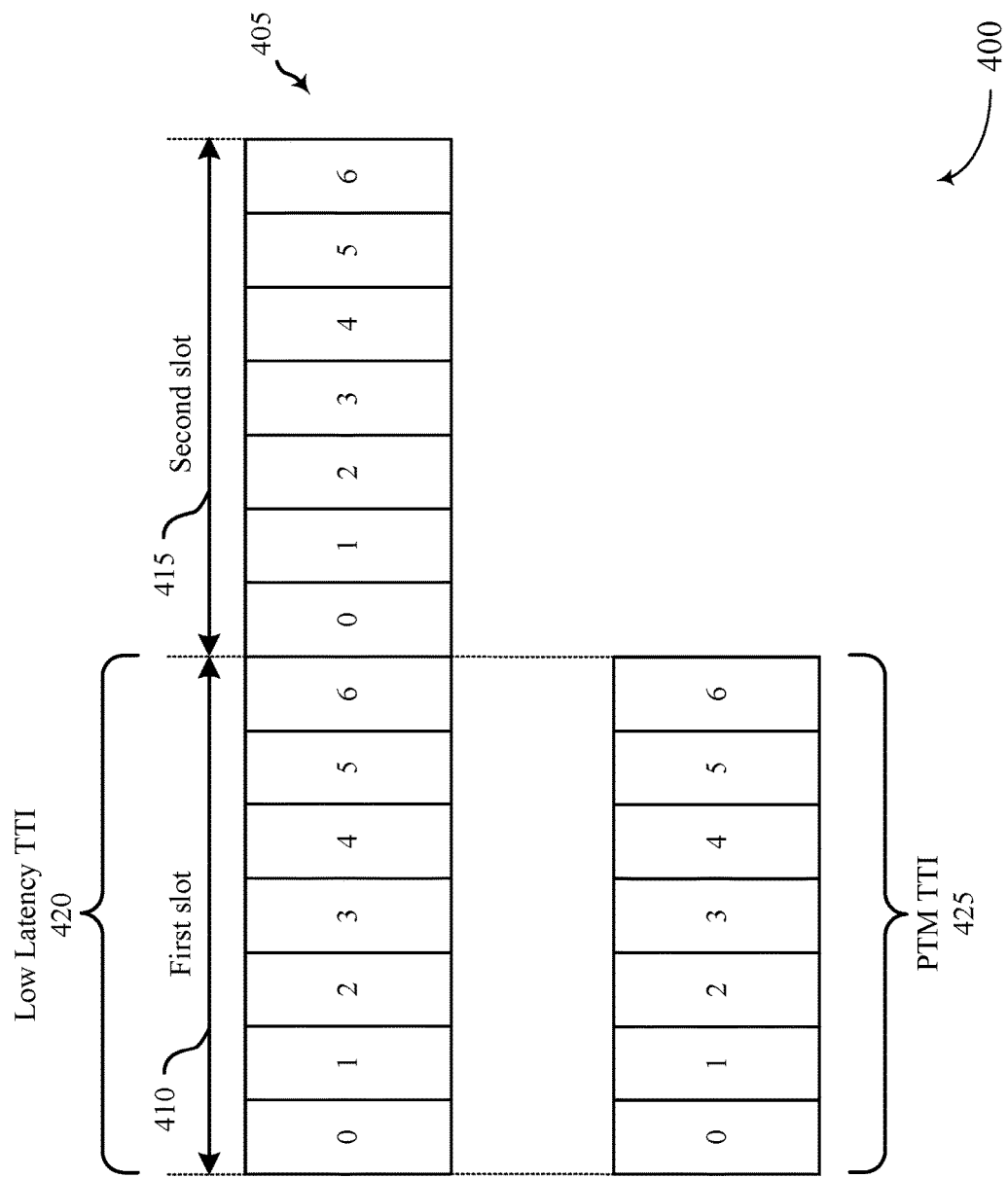
FIG. 4 illustrates an example of wireless resources with aligned unicast and PTM TTI durations that support low latency PTM communication in accordance with aspects of the present disclosure.

FIG. 4 illustrates an example of wireless resources 400 with aligned unicast and PTM TTI durations that support low latency PTM communication in accordance with aspects of the present disclosure. In some cases, wireless resources 400 may represent aspects of wireless resources used by a UE 115 or base station 105 as described with reference to FIGS. 1-2. In the example of FIG. 4, a base station may transmit legacy and/or low latency unicast transmissions in subframe 405, as well as low latency PTM transmissions in subframe 405. In such cases, a base station may prioritize the PTM transmissions ahead of unicast transmissions. Such a prioritization may provide that the PTM transmissions to multiple UEs may be transmitted ahead of unicast data to a single UE. In cases where low latency unicast services and PTM services are available at a same base station, the base station, in some examples, may prioritize PTM services ahead of unicast services. In cases where one base station supports LTE or low latency unicast LTE services, and an adjacent base station supports low latency PTM services, UEs within a coverage area of both base stations may be configured to perform symbol-based interference estimation to enhance data demodulation quality. In some examples, coordination between such adjacent base stations may provide coordinated scheduling such that unicast LTE transmissions and low latency PTM transmissions have relatively little or no interference with each other.

With continued reference to FIG. 4, in cases where a same base station supports both unicast and PTM services, and the wireless resources for the PTM and unicast services overlap, the base station may, in some examples, multiplex resources for the different services. In the example of FIG. 4, subframe 405 associated with a legacy LTE unicast transmission may have a first slot 410 and a second slot 415, each having seven OFDM symbol periods. A low latency PTM transmission may have a one slot TTI 425, which may correspond to the first slot 410 of subframe 405. In some examples, a UE receiving transmissions may perform blind detection to determine the presence of the PTM transmissions, such as by using the received power over each symbol period to identify symbol periods with PTM transmissions. In some examples, UEs receiving the unicast transmissions may discard signals received in wireless resources punctured by the PTM transmissions. An alternative approach is to multiplex both transmissions over the shared resources in conjunction with interference cancellation capability at the UEs. In some examples, the presence of the low latency PTM resources in the first slot 410 may be indicated to a UE that is not receiving the PTM transmissions via a control channel transmission of a following subframe to allow the UE to discard the signals received in the PTM resources. In other cases, the low latency unicast transmissions and low latency PTM transmissions may have different TTI durations, or the TTIs may not be aligned. Examples of such wireless resources are illustrated in FIGS. 5A and 5B.

Figure 5A:
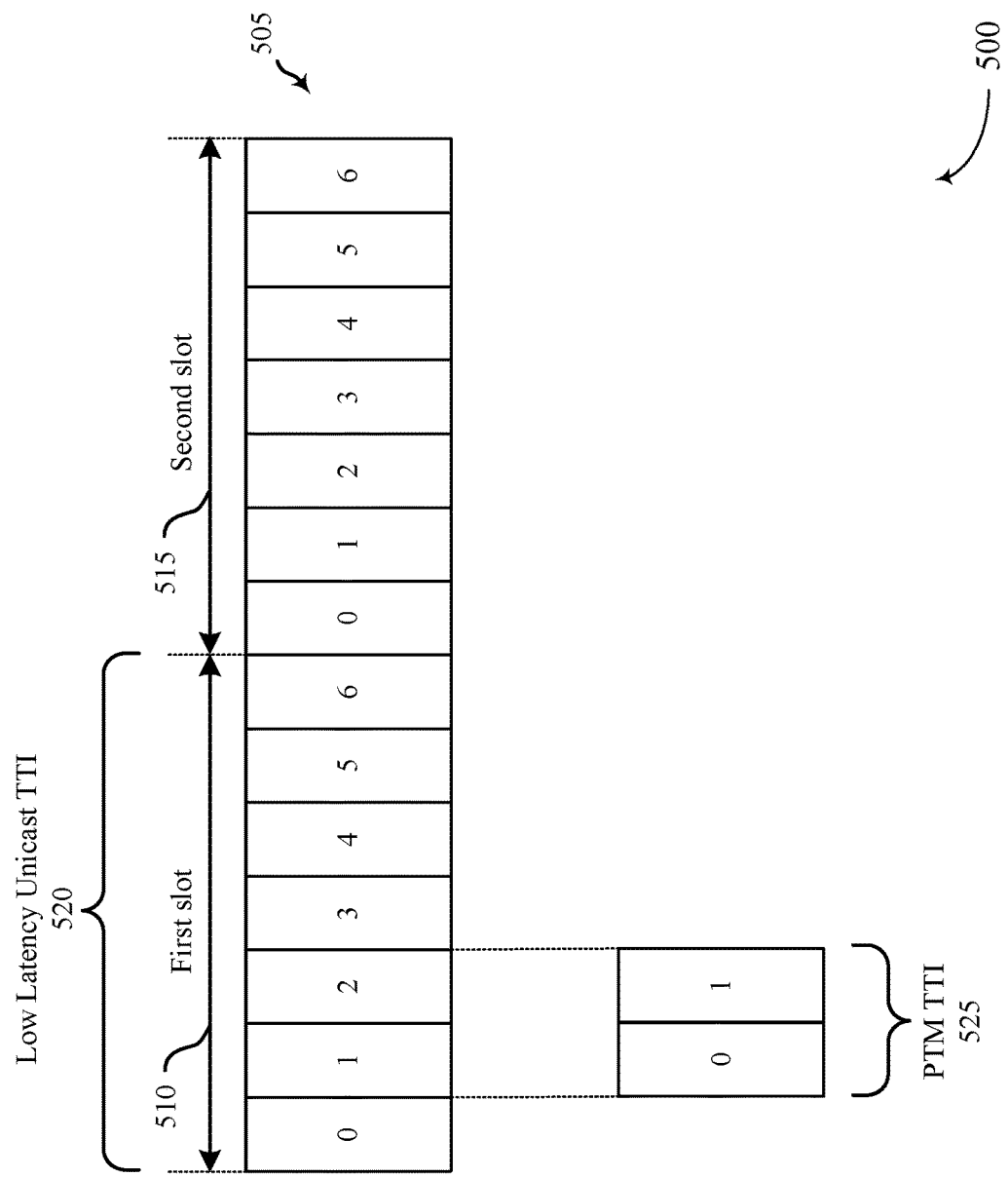
FIG. 5A illustrates an example of wireless resources in which low latency unicast transmissions may start prior to low latency PTM transmissions in accordance with aspects of the present disclosure.

FIG. 5A illustrates an example of wireless resources 500 in which low latency unicast transmissions may start prior to low latency PTM transmissions in accordance with aspects of the present disclosure. In some cases, wireless resources 500 and wireless resources 550 may represent aspects of wireless resources used by a UE 115 or base station 105 as described with reference to FIGS. 1-2.

In the example of wireless resources 500, subframe 505, having a first slot 510 and a second slot 515, may have overlapping low latency unicast transmissions and low latency PTM transmissions. Low latency unicast transmissions may, for example, include a low latency unicast TTI 520 that corresponds to the first slot 510 of subframe 505. Low latency PTM transmissions may have a PTM TTI 525 which in this example is a two-symbol TTI that starts after the start of the low latency unicast TTI 520. In this case, the resources of the PTM TTI 525 may include PTM transmissions that puncture the resources of the low latency unicast TTI 520 for the low latency unicast transmissions. In some examples, the base station may transmit an indication of the punctured resources to a receiving UE. In cases where multiple low latency PTM transmissions are scheduled, an indication of which symbol periods may be punctured in subsequent TTIs may be provided in the subsequent TTIs, and thus both transmissions may be multiplexed in conjunction with interference cancellation at receiving UEs.

Figure 5B:
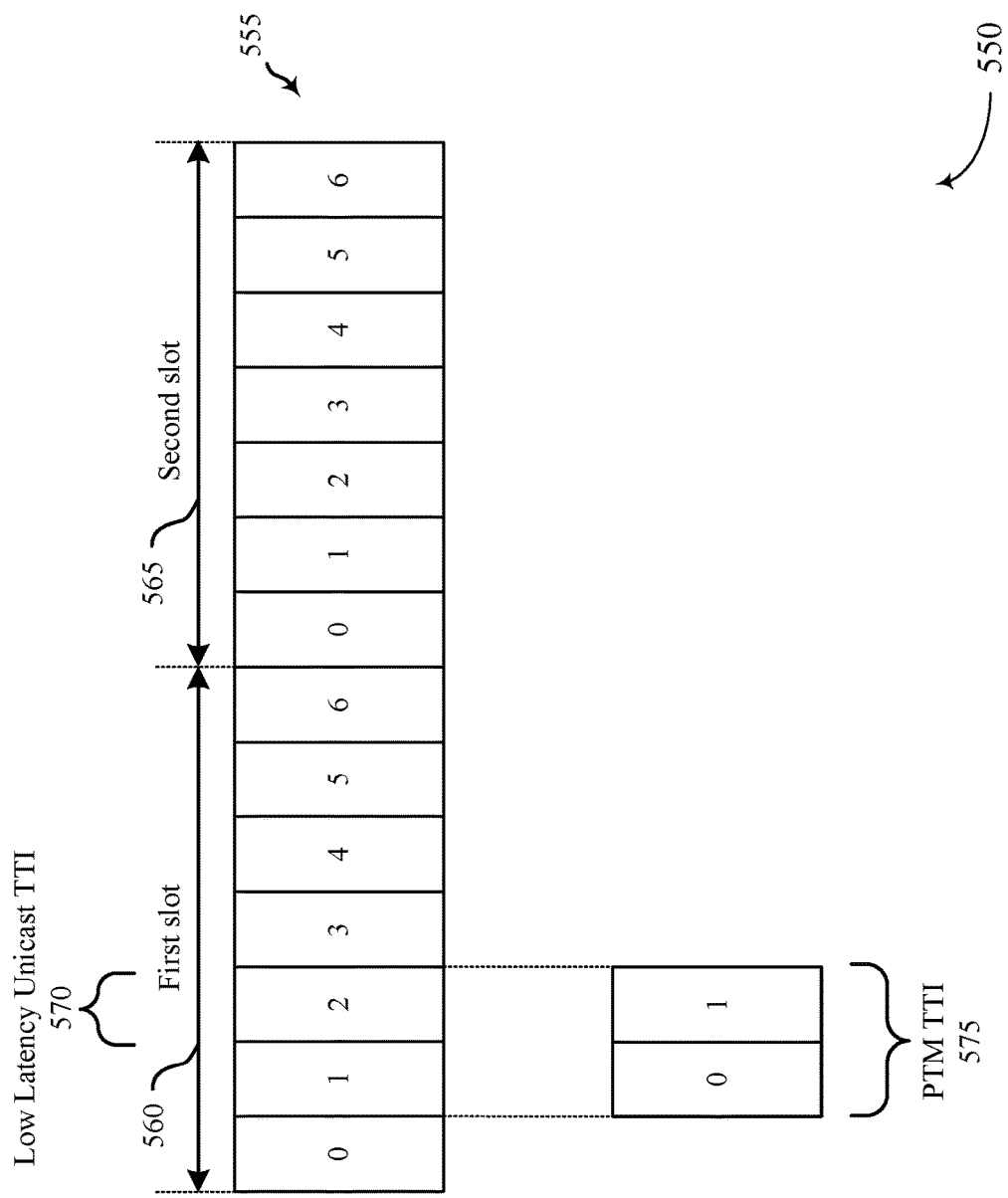
FIG. 5B illustrates an example of wireless resources in which low latency PTM transmissions may start prior to low latency unicast transmissions in accordance with aspects of the present disclosure.

FIG. 5B illustrates an example of wireless resources 550 in which low latency PTM transmissions may start prior to low latency unicast transmissions in accordance with aspects of the present disclosure. In some examples, wireless resources 550 may represent aspects of wireless resources used by a UE 115 or base station 105 as described with reference to FIGS. 1-2.

In the example of wireless resources 550, subframe 555, having a first slot 560 and a second slot 565, may have overlapping low latency unicast transmissions and low latency PTM transmissions. Low latency unicast transmissions may, for example, have a low latency unicast TTI 570, which in this example has a one-symbol TTI duration within the first slot 560 of subframe 555. Low latency PTM transmissions may have a PTM TTI 575 which in this example is a two-symbol TTI that starts before the start of the low latency unicast TTI 570. In this example, low latency unicast resources of the low latency unicast TTI 570 may be rate-matched around resources for the low latency PTM TTI 575.

In some cases, one or more reference signals may be present in one or more legacy transmissions configured with a subframe TTI duration, or in one or more low latency unicast transmissions configured with a TTI duration that is shorter than the subframe TTI duration. For example, a DMRS may be present in the legacy or low latency unicast resources. In such examples, resources of low latency PTM transmissions may be rate matched around resources of such reference signals, and an indication of the reference signal may be provided to a UE that is receiving the low latency PTM service. Such an indication of the reference signal may indicate the symbol of the reference signal, and in some examples may include an indication of the REs of the reference signal. In some examples, low latency PTM transmissions may be scheduled by a base station to avoid overlapping with control channel resources of legacy or low latency unicast transmissions.

Figure 6:
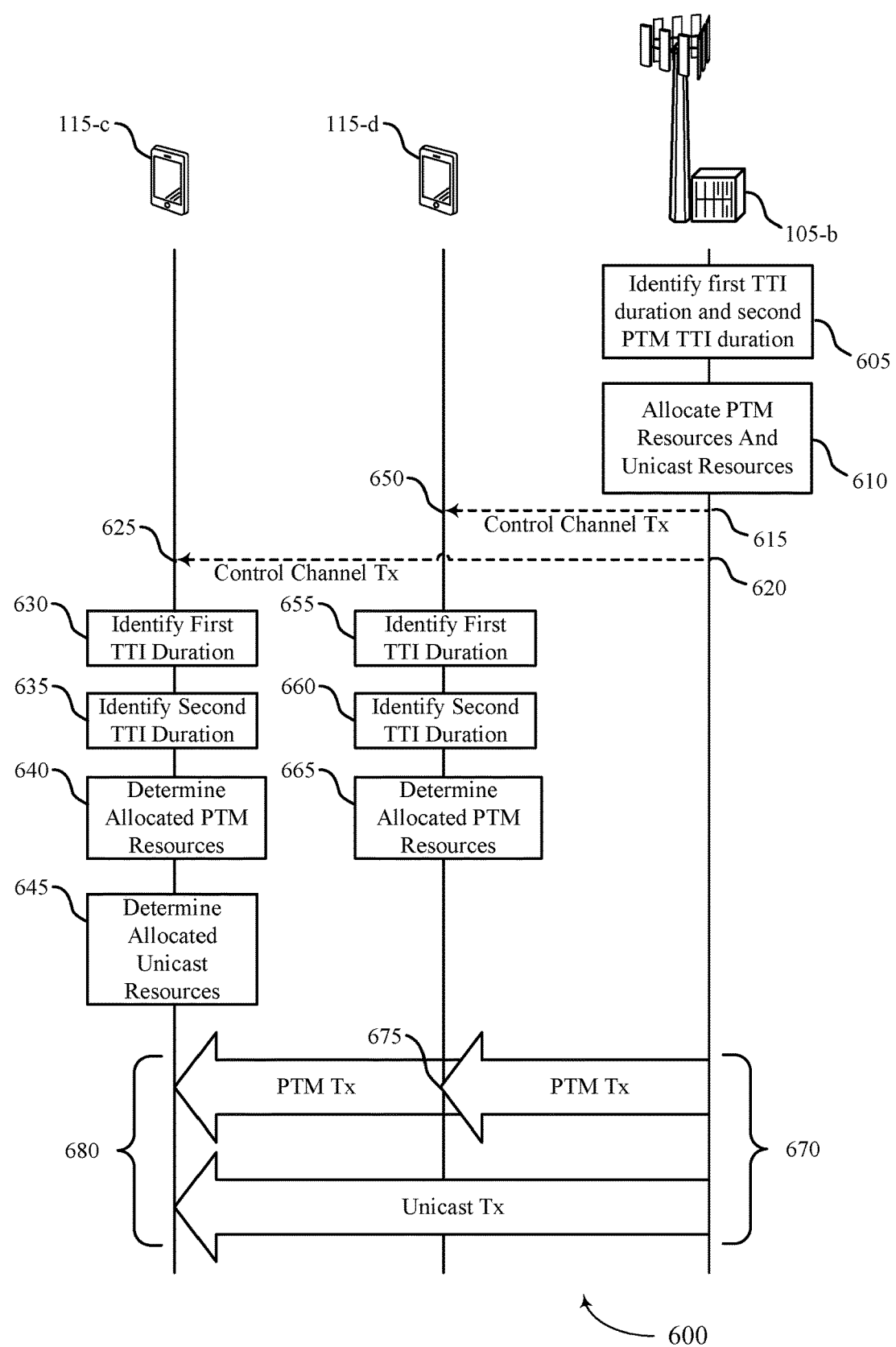
FIG. 6 illustrates an example of a process flow that supports low latency PTM communication in accordance with aspects of the present disclosure.

FIG. 6 illustrates an example of a process flow 600 that supports low latency PTM communication in accordance with aspects of the present disclosure. Process flow 600 may include operations by a base station 105-*b*, a first UE 115-*c*, and a second UE 115-*d*, which may be examples of the corresponding devices described with reference to FIGS. 1-2.

At 605, the base station 105-*b* may identify a first TTI duration and a second PTM TTI duration. The first TTI duration may be associated with a longer TTI duration than the second PTM TTI duration. In some examples, the first TTI duration may correspond to a duration of a LTE subframe and the second PTM TTI duration may correspond to a slot of the LTE subframe, two symbol periods of the LTE subframe, or one symbol period of the LTE subframe. In some examples, the base station 105-*b* may identify the first TTI duration and second PTM TTI duration based on one or more low latency PTM services that are to be provided by the base station 105-*b*. In some cases, multiple low latency PTM services may be provided by the base station 105-*b*, and additional TTI durations for the different PTM services may be identified, which may have a same TTI duration or different TTI durations.

At 610, the base station 105-*b* may allocate PTM resources and unicast resources for unicast and PTM transmissions. The wireless resources may be allocated in various manners, which may include examples where unicast resources are rate-matched around PTM resources, or examples where PTM resources puncture unicast resources. The resources may be configured with a TTI duration (e.g., unicast resources may be configured with the first TTI duration, and PTM resources may be configured with the second PTM TTI duration).

At 615, the base station 105-*b* may transmit one or more control channel transmissions to the second UE 115-*d* and at 620 the base station 105-*b* may transmit one or more control channel transmissions to first UE 115-*c*. The control channel transmissions transmitted at 615 and 620 may indicate the TTI durations identified at 605 and the wireless resources allocated at 610. In some examples, the control channel transmissions transmitted at 615 and 620 may include a group indication associated with a particular PTM service, and the first UE 115-*c* and/or second UE 115-*d* may be configured with a group ID that is also associated with the particular PTM service.

At 625, the first UE 115-*c* may receive the one or more control channel transmissions transmitted by the base station 105-b at 620. At 630, the first UE 115-c may identify the first TTI duration identified by the base station 105-b at 605, and at 635 the first UE 115-c may identify the second TTI duration identified by the base station 105-b at 605. In some examples the identification of the second TTI duration at 635 may be based, at least in part, on the group ID of the first UE 115-c, and a group indicator of the one or more control channel transmissions transmitted by the base station 105-b at 620. At 640, the first UE 115-c may determine allocated PTM resources, and at 645, the first UE 115-c may determine allocated unicast resources, which may overlap with the allocated PTM resources.

At 650, the second UE 115-d may receive the one or more control channel transmissions transmitted by the base station 105-b at 615. At 655, the second UE 115-d may identify the first TTI duration identified by the base station 105-b at 605, and at 660 the second UE 115-d may identify the second TTI duration identified by the base station 105-b at 605. In some examples the identification of the second TTI duration at 660 may be based, at least in part, on the group ID of the second UE 115-d, and a group indicator of the one or more control channel transmissions transmitted by the base station 105-b at 615. At 665, the second UE 115-d may determine allocated PTM resources.

At 670, the base station 105-b may transmit PTM transmissions and unicast transmissions. In some examples, PTM transmissions transmitted at 670 may be configured with a low latency TTI duration as described in the present disclosure. In some examples unicast transmissions transmitted at 670 may include legacy unicast transmissions configured with a legacy TTI duration, low latency unicast transmissions configured with the low latency TTI duration, or combinations thereof.

At 675, the second UE 115-d may receive the PTM transmissions using the resources allocated at 610, and may subsequently process the PTM transmission to decode PTM data.

At 680, the first UE 115-c may receive the PTM transmission and the unicast transmission using the resources allocated at 610, and may subsequently process the transmissions to decode the PTM data and unicast data.

Figure 7:
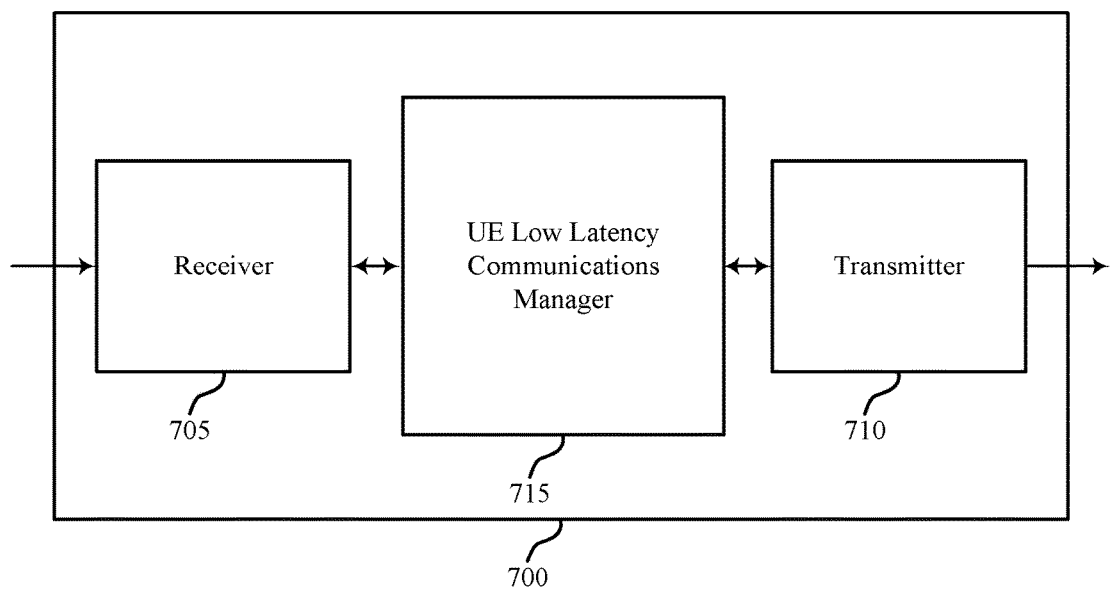
FIGS. 7 and 8 show block diagrams of wireless devices that support low latency PTM communication in accordance with aspects of the present disclosure.

FIG. 7 shows a block diagram of a wireless device 700 that supports low latency PTM communication in accordance with aspects of the present disclosure. Wireless device 700 may be an example of aspects of a UE 115 described with reference to FIG. 1, 2, or 6. Wireless device 700 may include a receiver 705, a transmitter 710, and a UE low latency communications manager 715. Wireless device 700 may also include a processor. Each of these components may be in communication with each other.

The receiver 705 may receive information such as packets, user data, or control information associated with various information channels (e.g., control channels, data channels, and information related to low latency point to multipoint communication, etc.). Information may be passed on to other components of the device. The receiver 705 may be an example of aspects of the transceiver 1025 described with reference to FIG. 10. The receiver 705 may include a single antenna, or it may include a plurality of antennas.

The transmitter 710 may transmit signals received from other components of wireless device 700. In some examples, the transmitter 710 may be collocated with a receiver in a transceiver module. For example, the transmitter 710 may be an example of aspects of the transceiver 1025 described with reference to FIG. 10. The transmitter 710 may include a single antenna, or it may include a plurality of antennas.

The UE low latency communications manager 715 may be associated with a first UE, and may receive (e.g., in cooperation with the receiver 705) a first control channel transmission that allocates a first set of wireless resources for a first set of transmissions intended for two or more UEs (e.g., PTM transmissions intended for the first UE and a second UE), and a second control channel transmission that allocates a second set of wireless resources for a second set of transmissions intended for the first UE (e.g., unicast transmissions intended for the first UE). The first set of transmissions may be low latency PTM transmissions, and the second set of transmissions may be low latency unicast transmissions, legacy unicast transmissions, or combinations thereof. The UE low latency communications manager 715 may identify a first TTI duration for reception of the first set of transmissions, and a second TTI duration for reception of the second set of transmissions intended for the first UE, where the second TTI duration is longer than the first TTI duration. The UE low latency communications manager 715 may determine that the first set of transmissions is to be received at the first UE based on reception of the first control channel transmission (e.g., based on a group identification of the first control channel transmission), and responsive to the determining, may receive (e.g., in cooperation with the receiver 705) the first set of transmissions using the first set of resources, where the first set of resources may, for example, be configured with the first TTI duration. The UE low latency communications manager 715 may be an example of aspects of the UE low latency communications manager 1005 described with reference to FIG. 10.

Figure 8:
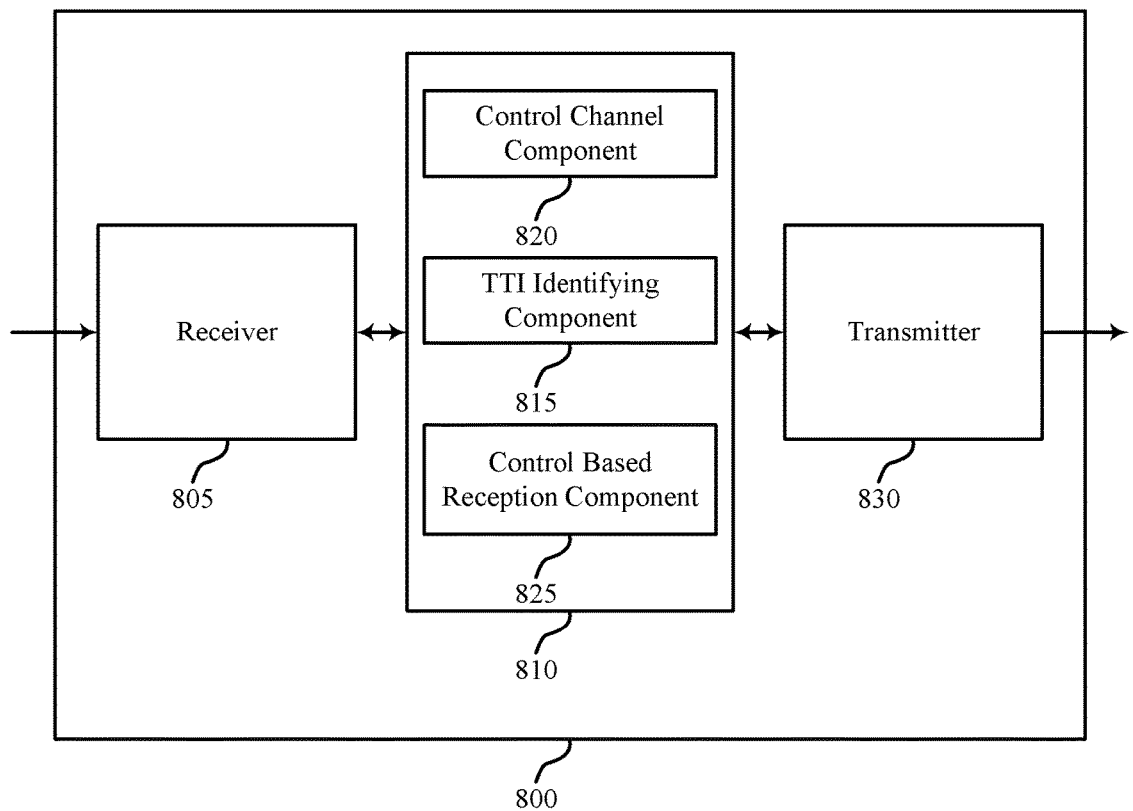

FIG. 8 shows a block diagram of a wireless device 800 that supports low latency PTM communication in accordance with aspects of the present disclosure. Wireless device 800 may be an example of aspects of a wireless device 700 or a UE 115 described with reference to FIGS. 1, 2 and 6-7. Wireless device 800 may include a receiver 805, a UE low latency communications manager 810, and a transmitter 830. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10. The receiver 805 may utilize a single antenna, or it may utilize a plurality of antennas.

The UE low latency communications manager 810 may be an example of aspects of UE low latency communications manager 715 described with reference to FIG. 7, and may be associated with a first UE. The UE low latency communications manager 810 may include a TTI identifying component 815, a control channel component 820, and a control based reception component 825. The UE low latency communications manager 810 may be an example of aspects of the UE low latency communications manager 1005 described with reference to FIG. 10.

The TTI identifying component 815 may identify a first TTI duration for reception of the first set of transmissions, and a second TTI duration for reception of the second set of transmissions intended for the first UE, where the second TTI duration may be longer than the first TTI duration. In some cases, identifying first TTI duration and the second TTI duration includes determining that the second TTI duration corresponds to a duration of a subframe of a radio frame and that the first TTI duration corresponds to a portion of the duration of the subframe. For example, the subframe may include two or more OFDM symbol periods, and the first TTI duration may correspond to one or more of the OFDM symbol periods. In some cases, the subframe includes a set of TTIs having the first TTI duration, and the first set of transmissions may be transmitted in a same first TTI location within different subframes (e.g., in a first slot of multiple subframes that are configured with wireless resources for the first set of transmissions).

In some cases, the first control channel transmission indicates the first TTI duration. In some cases, the indication of the first TTI duration is received dynamically in an indication of downlink wireless resources that include the first set of transmissions. In some cases, the indication of the first TTI duration is received semi-statically, such as in a SIB that configures one or more parameters associated with the first set of transmissions. In some cases, the first TTI duration corresponds with a duration of a low latency TTI for receiving a set of unicast transmissions transmitted to the first UE. As sued herein, a set of unicast transmissions may include a single unicast transmission and/or multiple unicast transmissions.

The control channel component 820 may receive (e.g., in cooperation with the receiver 805) a first control channel transmission that allocates a first set of wireless resources for a first set of transmissions intended for two or more UEs and a second control channel transmission that allocates a second set of wireless resources for a second set of transmissions intended for the first UE. In some cases, the first control channel transmission includes one or more of scheduling information for the first set of transmissions or monitoring durations for monitoring subsequent control channel transmissions. The first set of wireless resources may be configured with the first TTI duration, and the second set of wireless resources may be configured with the second TTI duration.

The control based reception component 825 may determine that the first set of transmissions is to be received at the first UE based on reception of the first control channel transmission, and receive (e.g., in cooperation with the receiver 805) the first set of transmissions using the first TTI responsive to the determining. In some cases, receiving the first set of transmissions further includes receiving a traffic channel identified by the first set of wireless resources. In some cases, the traffic channel includes a portion of a PDSCH used for the second set of transmissions.

The transmitter 830 may transmit signals received from other components of wireless device 800. The transmitter 830 may also perform the functions described with reference to the transmitter 710 of FIG. 7. In some examples, the transmitter 830 may be collocated with a receiver in a transceiver module. For example, the transmitter 830 may be an example of aspects of the transceiver 1025 described with reference to FIG. 10. The transmitter 830 may utilize a single antenna, or it may utilize a plurality of antennas.

Figure 9:
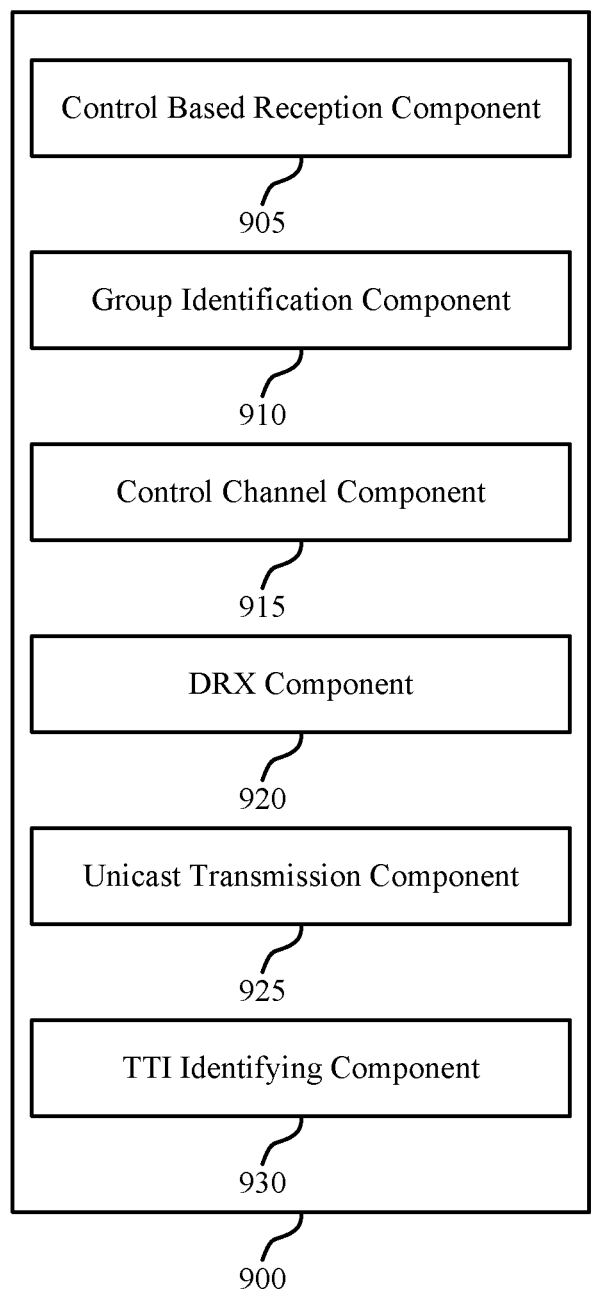
FIG. 9 shows a block diagram of a UE low latency communications manager in accordance with aspects of the present disclosure.

FIG. 9 shows a block diagram of a UE low latency communications manager 900 in accordance with aspects of the present disclosure. UE low latency communications manager 900 may be an example of aspects of UE low latency communications manager 715 or UE low latency communications manager 810 described with reference to FIGS. 7 and 8 and may be associated with a first UE. The UE low latency communications manager 900 may also be an example of aspects of the UE low latency communications manager 1005 described with reference to FIG. 10.

The UE low latency communications manager 900 may include a control based reception component 905, a group identification component 910, a control channel component 915, a DRX component 920, a unicast transmission component 925, and a TTI identifying component 930. Each of these modules may communicate, directly or indirectly, with one another (e.g., via one or more buses).

The control based reception component 905 may determine that the first set of transmissions is to be received at the first UE based on reception of the first control channel transmission, and receive (e.g., in cooperation with a receiver), responsive to the determining, the first set of transmissions using the first set of resources, where the first set of wireless resources may be configured with the first TTI.

The group identification component 910 may determine that a first set of transmissions are intended for the first UE based on a first group identification and a group indication associated with the first set of transmissions (e.g., when the first UE has a first group identification). The group identification component 910 also may determine that a third set of transmissions, such as PTM transmissions intended for two or more UEs and associated with the second service, are to be received at the first UE based on a second group identification of the first UE and a second group indication associated with the third set of transmissions. In such examples, the TTI identifying component 930 may identify a third TTI duration for receiving the third set of transmissions.

In some cases, the first group identification is associated with a first broadcast service, and the second group identification of the first UE is associated with a second service. In some cases, the third set of transmissions use the first TTI, or may use a different TTI. For example, the first set of transmissions may be transmitted in a first slot of a subframe, and the third set of transmissions may be transmitted in a second slot of the subframe, the first slot and the second slot having a duration of the first TTI. In other examples, the first set of transmissions may occupy two symbols of the first slot, and the third set of transmissions may occupy one or two non-overlapping symbol of the first slot.

The control channel component 915 may receive (e.g., in cooperation with a receiver) the first control channel transmission that allocates the first set of wireless resources for the first set of transmissions intended for two or more UEs and the second control channel transmission that allocates the second set of wireless resources for the second set of transmissions intended for the first UE. In some cases, the first control channel transmission includes one or more of scheduling information for the first set of transmissions or monitoring durations for monitoring subsequent control channel transmissions.

The DRX component 920 may configure one or more DRX parameters, and in some examples, may configure first TTI DRX parameters separately from one or more second TTI DRX parameters. In some cases, the configuring includes one or more of: discontinuing DRX when it is determined that the first set of transmissions are to be received at the first UE, setting the one or more first TTI DRX parameters based on a traffic type of the first set of transmissions, or setting a first TTI DRX periodicity or offset based on the second TTI duration and setting a first TTI DRX on-duration based on the first TTI duration.

The unicast transmission component 925 may determine that a unicast transmission is configured to be transmitted concurrently with the first set of transmissions, and determine whether the first set of transmissions are received at the first UE concurrently with the unicast transmission. In some cases, the determining whether the first set of transmissions are received at the first UE concurrently with the unicast transmission includes blindly detecting that the unicast transmission and the first set of transmissions are concurrently received. In some cases, the blindly detecting includes comparing a received power (e.g., as received by a receiver) over two or more TTIs having the first TTI duration. In some cases, an indication may be received in a control channel indication that the first set of transmissions is to be transmitted concurrently with the unicast transmission.

In some cases, a unicast transmission may be rate matched around the first set of transmissions. In some cases, the first set of transmissions may be scheduled in resources that puncture resources scheduled for the unicast transmission, and the UE may perform interference cancellation on the received first set of transmissions. In some cases, the first set of transmissions may be rate matched around one or more reference signals associated with the unicast transmission.

The TTI identifying component 930 may identify a first TTI duration for reception of the first set of transmissions, and a second TTI duration for reception of the second set of transmissions intended for the first UE, where the second TTI duration is longer than the first TTI duration.

Figure 10:
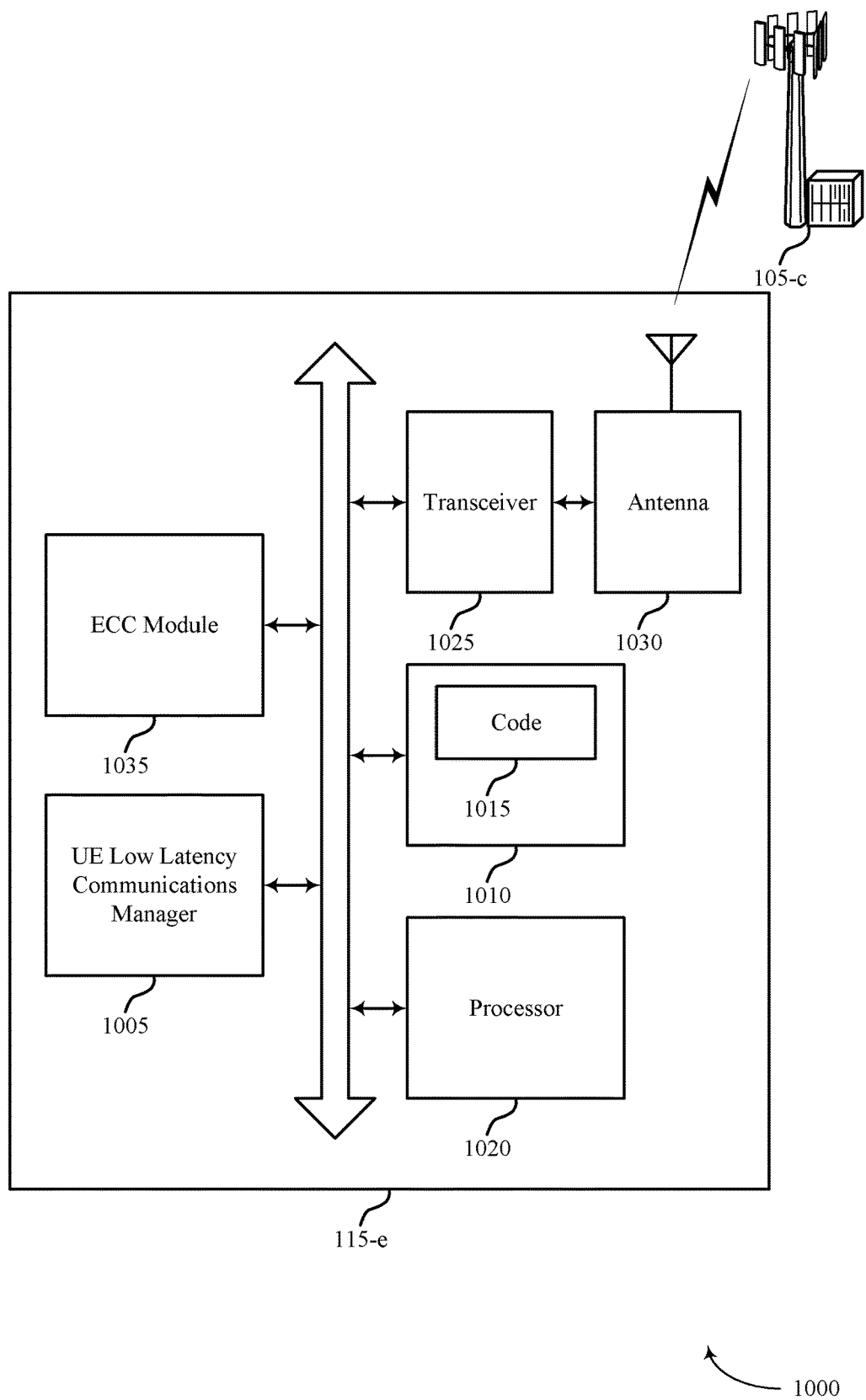
FIG. 10 shows a diagram of a system including a UE that supports low latency PTM communication in accordance with aspects of the present disclosure.

FIG. 10 shows a diagram of a system 1000 including a UE 115-e that supports low latency PTM communication in accordance with aspects of the present disclosure. UE 115-e may be an example of a wireless device 700, a wireless device 800, or a UE 115 as described with reference to FIGS. 1, 2 and 6 through 8.

UE 115-e may include a UE low latency communications manager 1005, memory 1010, a processor 1020, a transceiver 1025, an antenna 1030 and an error correction code (ECC) module 1035. Each of these modules may communicate, directly or indirectly, with one another (e.g., via one or more buses). The UE low latency communications manager 1005 may be an example of a UE low latency communications manager as described with reference to FIGS. 7 through 9.

The memory 1010 may include random access memory (RAM) and read only memory (ROM). The memory 1010 may store computer-readable, computer-executable software/firmware code 1015 including instructions that are operable, when executed by the processor 1020, to cause the UE 115-c to perform various functions described herein (e.g., low latency point to multipoint communication, etc.). In some cases, the code 1015 may not be directly executable by the processor 1020 but may cause a computer (e.g., when compiled and executed) to cause the UE 115-e to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 (e.g., base station 105-c) or another UE 115. The transceiver 1025 may also include a modem to modulate the packets and provide the modulated packets to the antennas for transmission, and to demodulate packets received from the antennas. In some cases, the UE 115-e may include a single antenna 1030. However, in some cases the device may have more than one antenna 1030, which may be capable of concurrently transmitting or receiving multiple wireless transmissions.

The ECC module 1035 may enable operations using ECCs including operations using reduced or variable duration TTIs, wideband operations, or operations in unlicensed spectrum.

Figure 11:
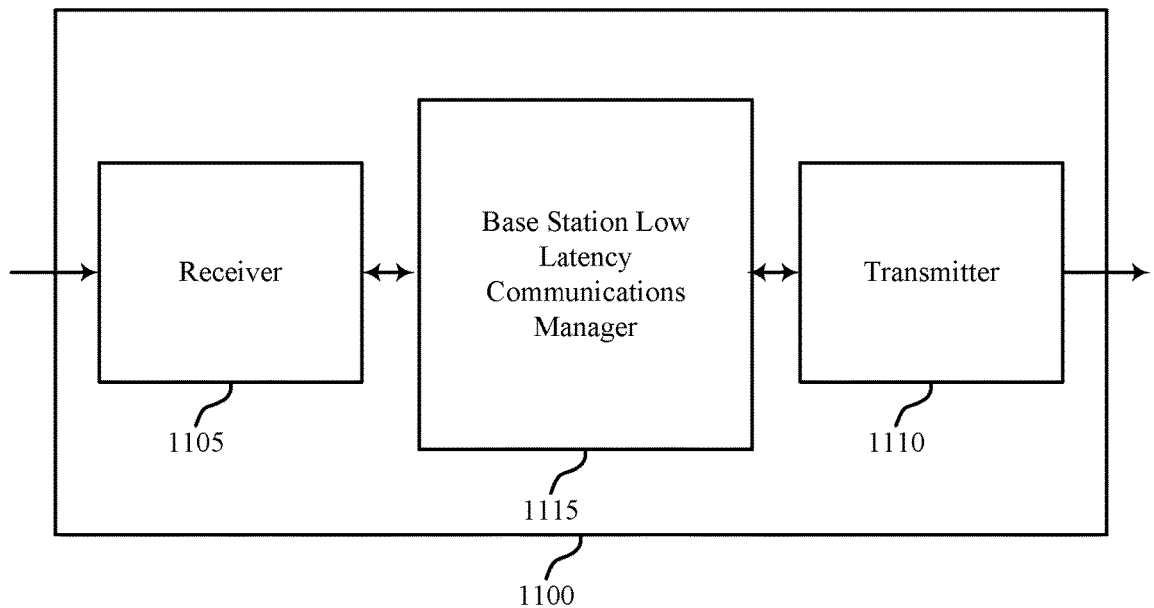
FIGS. 11 and 12 show block diagrams of wireless devices that support low latency PTM communication in accordance with aspects of the present disclosure.

FIG. 11 shows a block diagram of a wireless device 1100 that supports low latency PTM communication in accordance with aspects of the present disclosure. Wireless device 1100 may be an example of aspects of a base station 105 described with reference to FIGS. 1, 2, and 6. Wireless device 1100 may include a receiver 1105, a transmitter 1110, and a base station low latency communications manager 1115. Wireless device 1100 may also include a processor. Each of these components may be in communication with each other.

The receiver 1105 may receive information such as packets, user data, or control information associated with various information channels (e.g., control channels, data channels, and information related to low latency point to multipoint communication, etc.). Information may be passed on to other components of the device. The receiver 1105 may be an example of aspects of the transceiver 1425 described with reference to FIG. 14. The receiver 1105 may include a single antenna, or it may include a plurality of antennas.

The transmitter 1110 may transmit signals received from other components of wireless device 1100. In some examples, the transmitter 1110 may be collocated with a receiver in a transceiver module. For example, the transmitter 1110 may be an example of aspects of the transceiver 1425 described with reference to FIG. 14. The transmitter 1110 may include a single antenna, or it may include a plurality of antennas.

The base station low latency communications manager 1115 may identify a first TTI duration for transmitting a first set of transmissions to at least a first UE and a second UE (e.g., a set of PTM transmissions), and a second TTI duration for transmitting a second set of transmissions to one or more UEs (e.g., a set of unicast transmissions). In some examples the second TTI duration may be longer than the first TTI duration. The base station low latency communications manager 1115 may determine that the first UE and second UE are to receive the first set of transmissions, and transmit (e.g., in cooperation with the transmitter 1110) the first set of transmissions to the first UE and the second UE using a first set of wireless resources, which may be configured with the first TTI. The base station low latency communications manager 1115 may transmit (e.g., in cooperation with the transmitter 1110) the second set of transmissions using a second set of wireless resources, which may be configured with the second TTI. The first set of transmissions may be, for example, low latency PTM transmissions, and the second set of transmissions may be unicast transmissions. The base station low latency communications manager 1115 may be an example of aspects of the base station low latency communications manager 1405 described with reference to FIG. 14.

Figure 12:
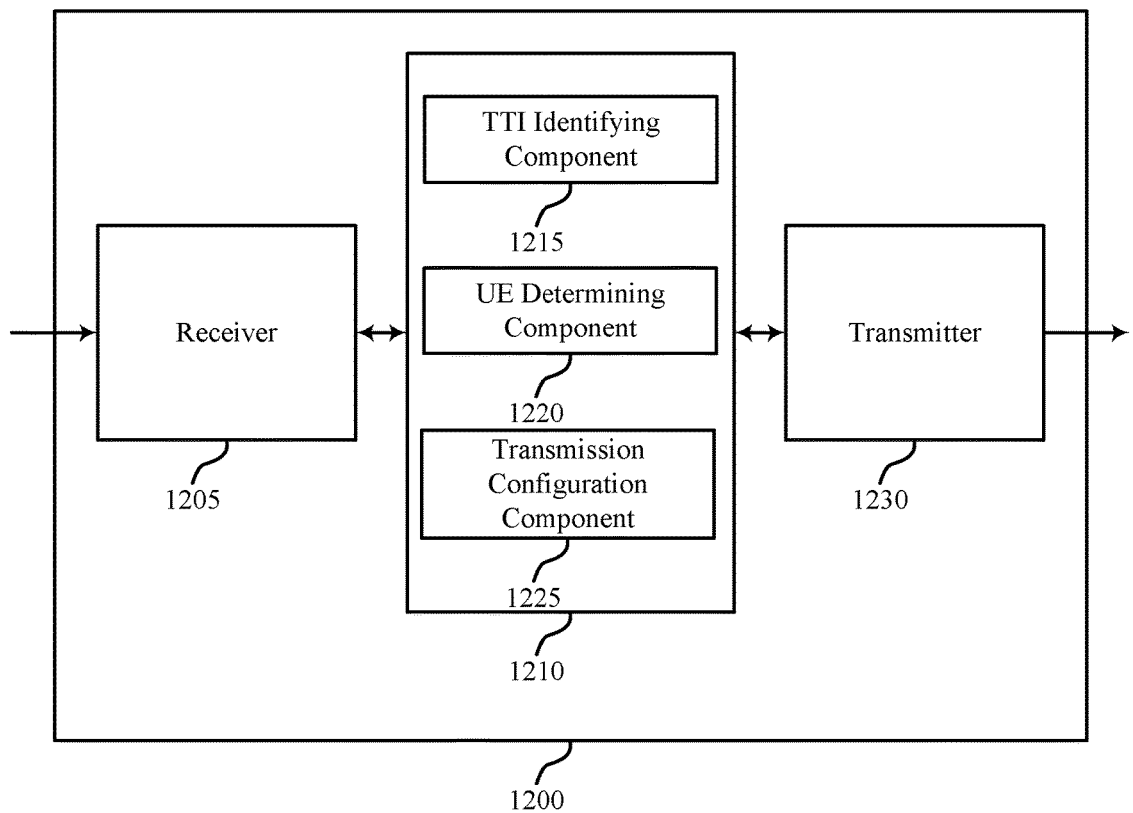

FIG. 12 shows a block diagram of a wireless device 1200 that supports low latency PTM communication in accordance with aspects of the present disclosure. Wireless device 1200 may be an example of aspects of a wireless device 1100 or a base station 105 described with reference to FIGS. 1, 2, 6 and 11. Wireless device 1200 may include a receiver 1205, a base station low latency communications manager 1210 and a transmitter 1230. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. In some examples, the receiver 1205 may be collocated with a receiver in a transceiver module. For example the receiver 1205 may be an example of aspects of the transceiver 1425 described with reference to FIG. 14. The receiver 1205 may utilize a single antenna, or it may utilize a plurality of antennas.

The base station low latency communications manager 1210 may be an example of aspects of base station low latency communications manager 1115 described with reference to FIG. 11. The base station low latency communications manager 1210 may include a TTI identifying component 1215, a UE determining component 1220, and a transmission configuration component 1225. The base station low latency communications manager 1210 may be an example of aspects of the base station low latency communications manager 1405 described with reference to FIG. 14.

The TTI identifying component 1215 may identify a first TTI duration for transmitting a first set of transmissions to at least a first UE and a second UE, and a second TTI duration for transmitting a second set of transmissions to one or more UEs, where the second TTI duration is longer than the first TTI duration. In some cases, the second TTI duration corresponds to a duration of a subframe of a radio frame and the first TTI duration corresponds to a portion of the duration of the subframe. In some cases, the subframe includes two or more OFDM symbol periods, and the first TTI duration corresponds to one or more of the OFDM symbol periods. In some cases, the subframe includes a set of TTIs having the first TTI duration, and the first set of transmissions may be transmitted in a same first TTI location within different subframes. In some cases, the first TTI duration corresponds with a duration of a low latency TTI for a set of unicast transmissions transmitted to the first UE.

The UE determining component 1220 may determine that the first UE and second UE are to receive the first set of transmissions. The transmission configuration component 1225 may transmit (e.g., in cooperation with the transmitter 1230) the first set of transmissions to the first UE and the second UE using a first set of wireless resources that are configured with the first TTI, and transmit the second set of transmissions using a second set of resources configured with the second TTI.

The transmitter 1230 may transmit signals received from other components of wireless device 1200. The transmitter may also perform the functions described with reference to the transmitter 1110 of FIG. 11. In some examples, the transmitter 1230 may be collocated with a receiver in a transceiver module. For example, the transmitter 1230 may be an example of aspects of the transceiver 1425 described with reference to FIG. 14. The transmitter 1230 may utilize a single antenna, or it may utilize a plurality of antennas.

Figure 13:
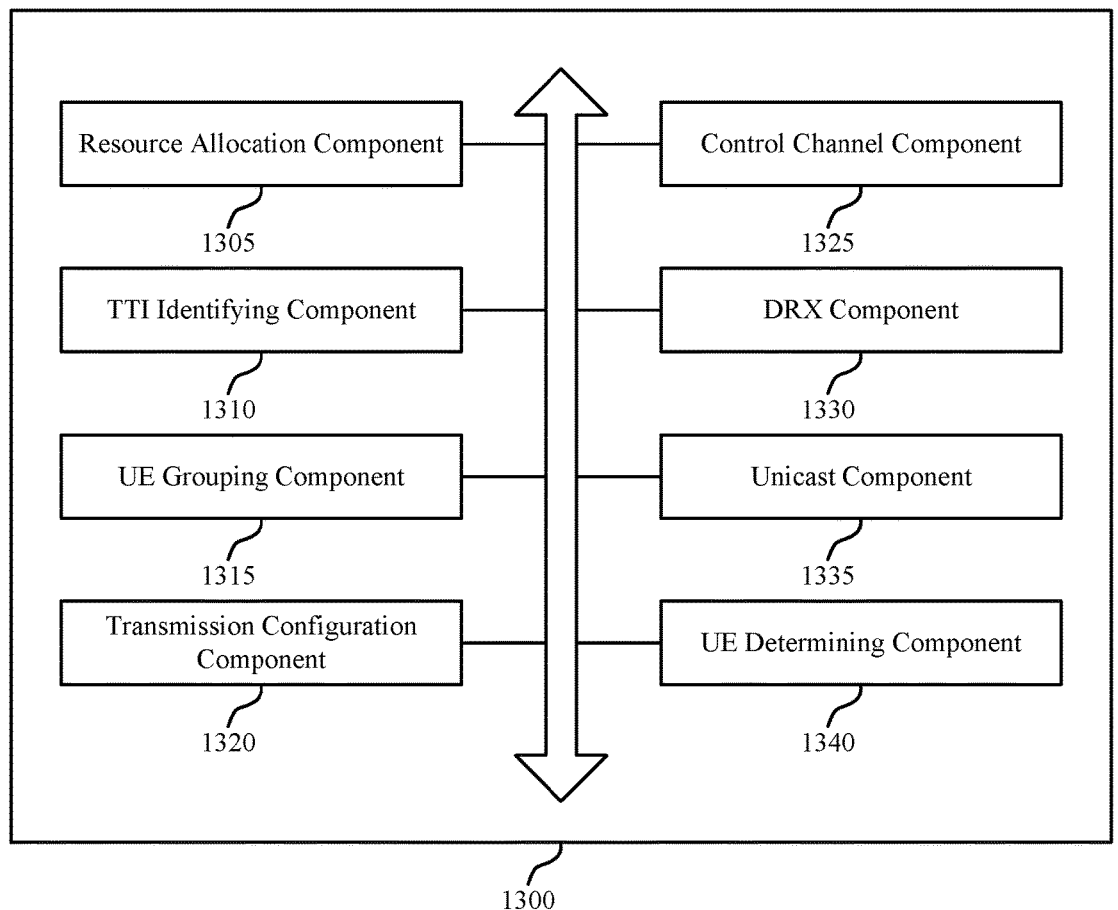
FIG. 13 shows a block diagram of a base station low latency communications manager that supports low latency PTM communication in accordance with aspects of the present disclosure.

FIG. 13 shows a block diagram of a base station low latency communications manager 1300 that supports low latency PTM communications in accordance with aspects of the present disclosure. Base station low latency communications manager 1300 may be an example of aspects of base station low latency communications manager 1115 or base station low latency communications manager 1210 described with reference to FIGS. 11 and 12. The base station low latency communications manager 1300 may also be an example of aspects of the base station low latency communications manager 1405 described with reference to FIG. 14.

The base station low latency communications manager 1300 may include a resource allocation component 1305, a TTI identifying component 1310, a UE grouping component 1315, a transmission configuration component 1320, a control channel component 1325, a DRX component 1330, a unicast component 1335, and a UE determining component 1340. Each of these modules may communicate, directly or indirectly, with one another (e.g., via one or more buses).

The resource allocation component 1305 may allocate a first set of wireless resources for the first set of transmissions, allocate a second set of wireless resources for the second set of transmissions, and in some cases allocate additional sets or wireless resources for additional sets of transmissions (e.g., resources for different multicast services). The first set of wireless resources may be configured with a first TTI duration, and the second set of wireless resources may be configured with a second TTI duration. The first set of wireless resources may include a subset of the second set of wireless resources, and the allocation of the first set of wireless resources and the second set of wireless resources may be transmitted to the first UE and the second UE in one or more control channel transmissions. In some examples, a first control channel transmission may include one or more of scheduling information for the first set of transmissions or monitoring durations for monitoring subsequent control channel transmissions. In some cases, the first set of wireless resources include a traffic channel within a PDSCH used for the second set of transmissions.

The TTI identifying component 1310 may identify a first TTI duration for transmitting a first set of transmissions to at least a first UE and a second UE, and a second TTI duration for transmitting a second set of transmissions to one or more UEs, where the second TTI duration is longer than the first TTI duration. In some cases, the TTI identifying component 1310 may identify one or more additional TTI durations for one or more additional sets of transmissions, such as transmissions of different PTM services.

The UE grouping component 1315 may identify group IDs associated with different services, and in some cases may identify a second service to be provided to the first UE and the at least one other UE, that is to be provided via a third set of transmissions. In some cases, the UE grouping component 1315 may identify that the first UE and the second UE are to receive the first set of transmissions and configure the first UE and the second UE with a first group identification. In some cases, the first group identification is associated with a first broadcast service, and the UE grouping component 1315 also may configure the first UE and at least one other UE with a second group identification that is associated with a second service that may be provided by a third set of transmissions using a third set of wireless resources that use the first TTI duration. In some cases, the first set of transmissions are transmitted in a first slot of a subframe, and the third set of transmissions are transmitted in a second slot of the subframe, where the first slot and the second slot have the first TTI duration. In some cases, the third set of transmissions use a third TTI duration that is shorter than the second TTI duration.

The transmission configuration component 1320 may configure the first UE or second UE, or both, to receive the first set of transmissions using the first set of wireless resources configured with the first TTI duration, and the second set of transmissions using a second set of wireless resources configured with the second TTI duration.

The control channel component 1325 may transmit (e.g., in cooperation with a transmitter) a first control channel transmission that indicates the first TTI duration. In some cases, the indication of the first TTI duration is transmitted dynamically in an indication of downlink wireless resources that include the first set of transmissions. In some cases, the indication of the first TTI duration is transmitted semi-statically in a SIB that configures one or more parameters associated with the first set of transmissions.

The DRX component 1330 may configure one or more first TTI DRX parameters separately from one or more second TTI DRX parameters, and transmit the one or more first TTI DRX parameters and the one or more second TTI DRX parameters to the first UE and the second UE. In some cases, the configuring includes one or more of discontinuing DRX when it is determined that the first set of transmissions are to be received at the first UE, setting the one or more first TTI DRX parameters based on a traffic type of the first set of transmissions, or setting a first TTI DRX periodicity or offset based on the second TTI duration and setting a first TTI DRX on-duration based on the first TTI duration.

The unicast component 1335 may determine that a unicast transmission is to be transmitted concurrently with transmissions of the first set of transmissions, and may prioritize the first set of transmissions over the unicast transmission. The unicast component 1335 may transmit (e.g., in cooperation with a transmitter) an indication that the first set of transmissions are transmitted concurrently with the unicast transmission, rate match the unicast transmission around the first set of transmissions, rate match the first set of transmissions around one or more reference signals of the unicast transmission, or combinations thereof. The UE determining component 1340 may, in conjunction with the UE grouping component 1315 determine that the first UE and second UE are to receive the first set of transmissions.

Figure 14:
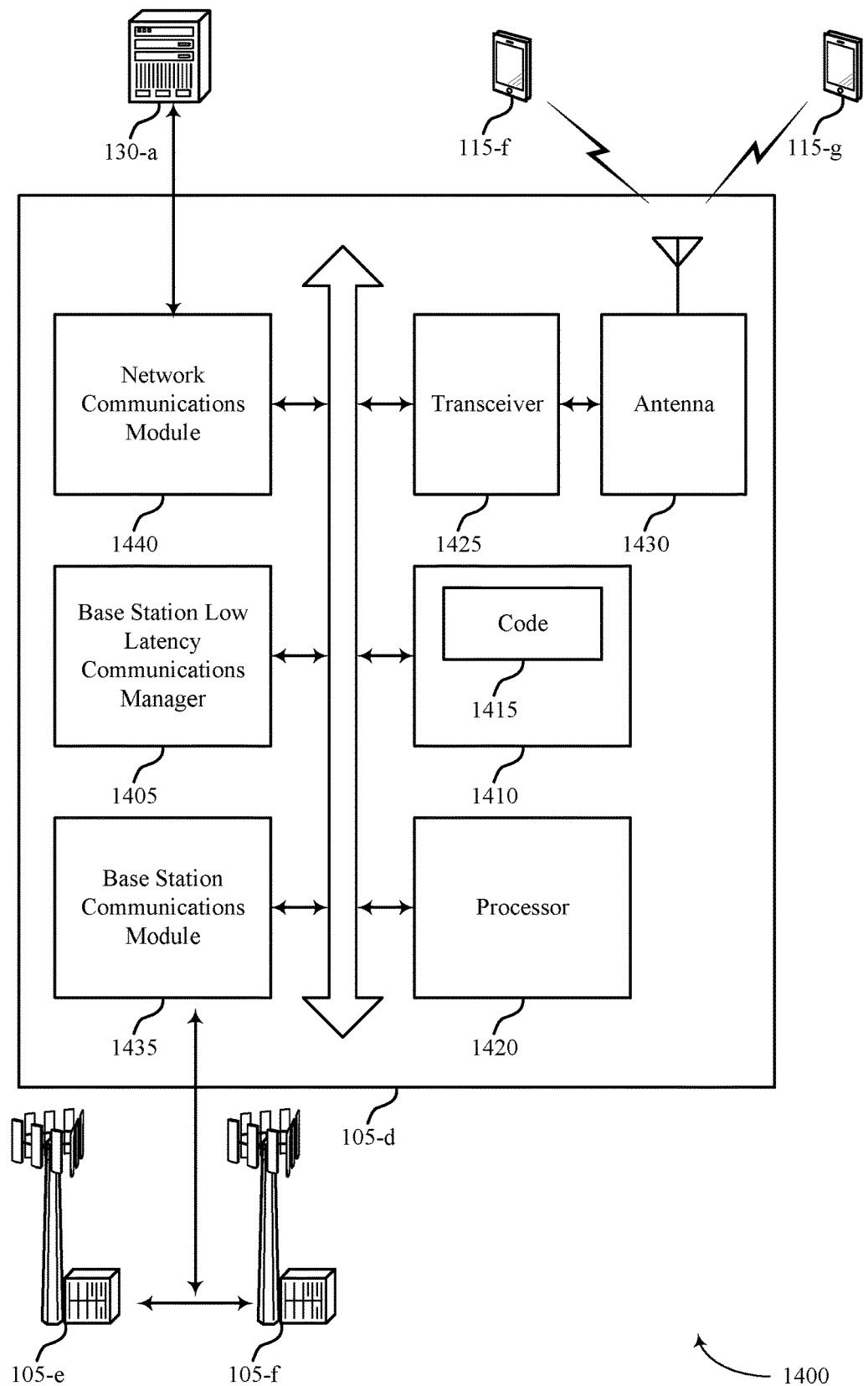
FIG. 14 shows a diagram of a system including a base station that supports low latency PTM communication in accordance with aspects of the present disclosure.

FIG. 14 shows a diagram of a system 1400 including a base station 105-*d* that supports low latency PTM communication in accordance with aspects of the present disclosure. Base station 105-*d* may be an example of a wireless device 1100, a wireless device 1200, or a base station 105 as described with reference to FIGS. 1, 2, 6 and 11 through 13. Base station 105-*d* may also include components for bi-directional voice and data communications including components for transmitting communications and components for receiving communications. For example, base station 105-*d* may communicate bi-directionally with one or more base stations (e.g., base station 105-*e* and base station 105-*f*) and/or one or more UEs 115 (e.g., UE 115-*f* and UE 115-*g*).

Base station 105-*d* may include a base station low latency communications manager 1405, memory 1410, a processor 1420, a transceiver 1425, an antenna 1430, a base station communications module 1435, and a network communications module 1440. Each of these modules may communicate, directly or indirectly, with one another (e.g., via one or more buses). The base station low latency communications manager 1405 may be an example of a base station low latency communications manager as described with reference to FIGS. 11 through 13.

The memory 1410 may include RAM and ROM. The memory 1410 may store computer-readable, computer-executable software/firmware code 1415 including instructions that, when executed by the processor 1420, cause the base station 105-*d* to perform various functions described herein (e.g., low latency point to multipoint communication, etc.). In some cases, the code 1415 may not be directly executable by the processor 1420, but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1430, which may be capable of concurrently transmitting or receiving multiple wireless transmissions.

The base station communications module 1435 may manage communications with other base station 105, and may include a controller or scheduler for controlling communications with UEs 115 in cooperation with other base stations 105. For example, the base station communications module 1435 may coordinate scheduling for transmissions to UEs 115 for various interference mitigation techniques such as beamforming or joint transmission. In some examples, base station communications module 1435 may provide a X2 interface within a LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
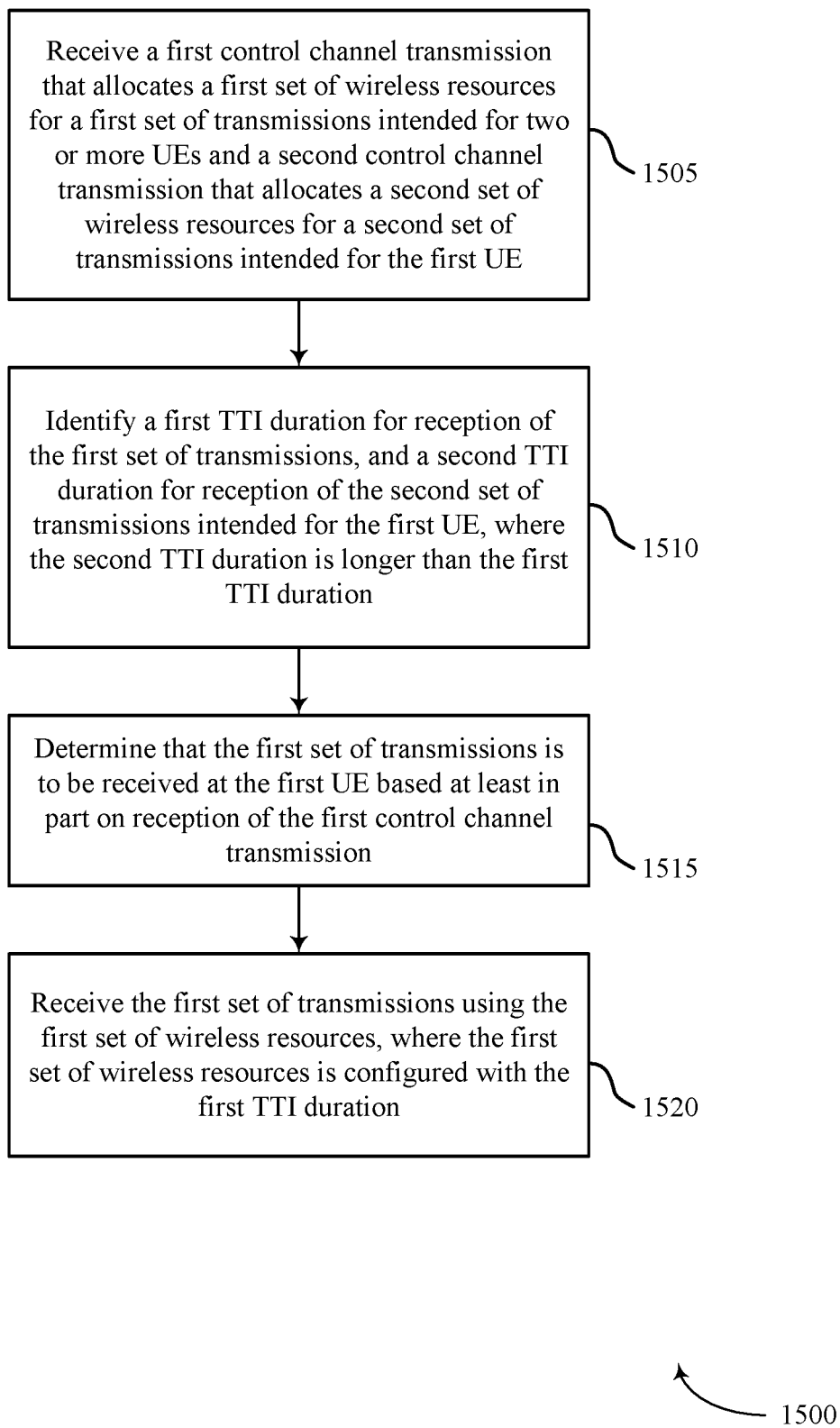
FIGS. 15 through 23 are flowcharts illustrating methods for low latency PTM communication in accordance with aspects of the present disclosure.

FIG. 15 shows a flowchart illustrating a method 1500 for low latency PTM communication in accordance with aspects of the present disclosure. The operations of method 1500 may be implemented by a device such as a UE 115 or its components as described with reference to FIGS. 1, 2, and 6-10. For example, the operations of method 1500 may be performed by the UE low latency communications manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a first control channel transmission that allocates a first set of wireless resources for a first set of transmissions intended for two or more UEs and a second control channel transmission that allocates a second set of wireless resources for a second set of transmissions intended for the first UE, as described above with reference to FIGS. 2 through 6. In certain examples, the operations of block 1505 may be performed by the control channel component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1510, the UE 115 may identify a first TTI duration for reception of the first set of transmissions, and a second TTI duration for reception of the second set of transmissions intended for the first UE, where the second TTI duration is longer than the first TTI duration, as described above with reference to FIGS. 2 through 6. In certain examples, the operations of block 1510 may be performed by the TTI identifying component as described with reference to FIGS. 8 and 9.

At block 1515, the UE 115 may determine that the first set of transmissions is to be received at the first UE based at least in part on reception of the first control channel transmission, as described above with reference to FIGS. 2 through 6. In certain examples, the operations of block 1515 may be performed by the control based reception component as described with reference to FIGS. 8 and 9.

At block 1520, the UE 115 may receive, responsive to the determining, the first set of transmissions using the first set of wireless resources, where the first set of wireless resources is configured with the first TTI duration, as described above with reference to FIGS. 2 through 6. In certain examples, the operations of block 1520 may be performed by the control based reception component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

Figure 16:
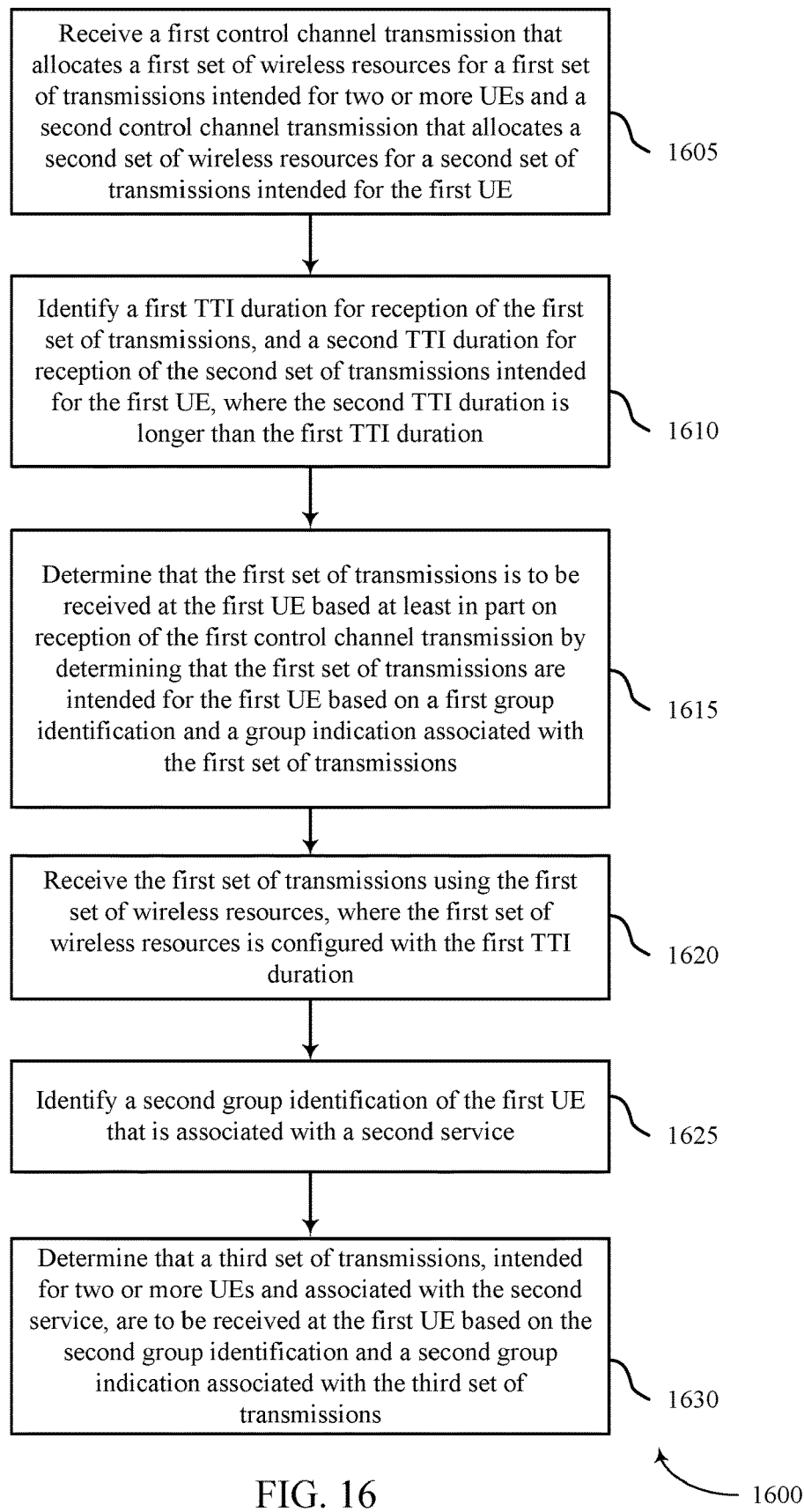

FIG. 16 shows a flowchart illustrating a method 1600 for low latency PTM communication in accordance with aspects of the present disclosure. The operations of method 1600 may be implemented by a device such as a UE 115 or its components as described with reference to FIGS. 1, 2, and 6-10. For example, the operations of method 1600 may be performed by the UE low latency communications manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive a first control channel transmission that allocates a first set of wireless resources for a first set of transmissions intended for two or more UEs and a second control channel transmission that allocates a second set of wireless resources for a second set of transmissions intended for the first UE as described above with reference to FIGS. 2 through 6. In certain examples, the operations of block 1605 may be performed by the control channel component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1610, the UE 115 may identify a first TTI duration for reception of the first set of transmissions, and a second TTI duration for reception of the second set of transmissions intended for the first UE, where the second TTI duration is longer than the first TTI duration, as described above with reference to FIGS. 2 through 6. In certain examples, the operations of block 1610 may be performed by the TTI identifying component as described with reference to FIGS. 8 and 9.

At block 1615, the UE 115 may determine that the first set of transmissions is to be received at the first UE based at least in part on reception of the first control channel transmission as described above with reference to FIGS. 2 through 6. In some cases, the first UE has a first group identification and the determining includes determining that the first set of transmissions are intended for the first UE based on the first group identification and a group indication associated with the first set of transmissions. In certain examples, the operations of block 1615 may be performed by the control based reception component as described with reference to FIGS. 8 and 9.

At block 1620, the UE 115 may receive, responsive to the determining of block 1615, the first set of transmissions using the first set of wireless resources, where the first set of wireless resources is configured with the first TTI duration, as described above with reference to FIGS. 2 through 6. In certain examples, the operations of block 1620 may be performed by the control based reception component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1625, when the first group identification is associated with a first broadcast service, the UE 115 may identify a second group identification of the first UE that is associated with a second service as described above with reference to FIGS. 2 through 6. In certain examples, the operations of block 1625 may be performed by the group identification component as described with reference to FIGS. 8 and 9.

At block 1630, the UE 115 may determine that a third set of transmissions, intended for two or more UEs and associated with the second service, are to be received at the first UE based on the second group identification and a second group indication associated with the third set of transmissions as described above with reference to FIGS. 2 through 6. In certain examples, the operations of block 1630 may be performed by the group identification component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

Figure 17:
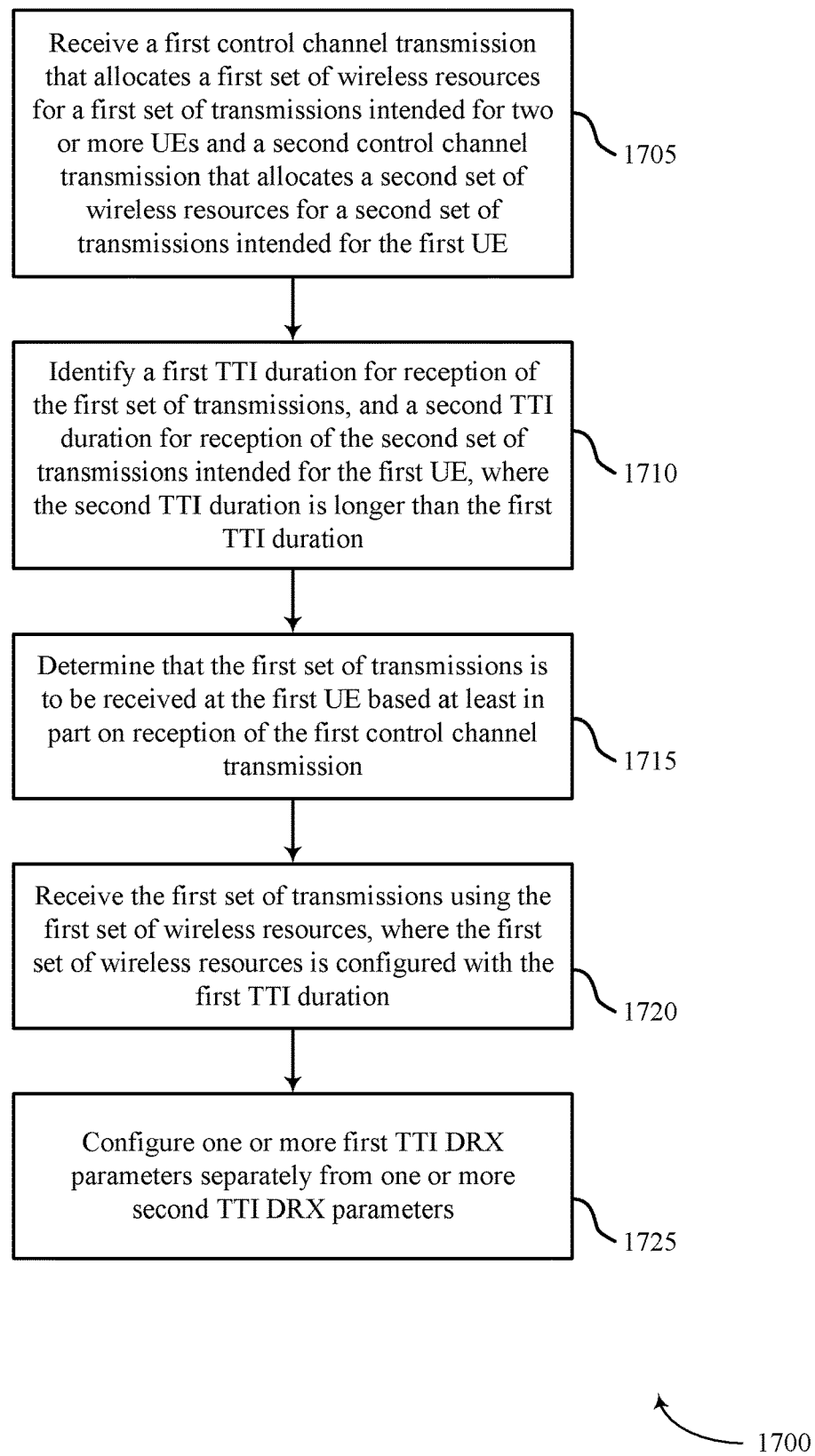

FIG. 17 shows a flowchart illustrating a method 1700 for low latency PTM communication in accordance with aspects of the present disclosure. The operations of method 1700 may be implemented by a device such as a UE 115 or its components as described with reference to FIGS. 1, 2 and 6-10. For example, the operations of method 1700 may be performed by the UE low latency communications manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive a first control channel transmission that allocates a first set of wireless resources for a first set of transmissions intended for two or more UEs and a second control channel transmission that allocates a second set of wireless resources for a second set of transmissions intended for the first UE, as described above with reference to FIGS. 2 through 6. In certain examples, the operations of block 1705 may be performed by the control channel component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1710, the UE 115 may identify a first TTI duration for reception of the first set of transmissions, and a second TTI duration for reception of the second set of transmissions intended for the first UE, where the second TTI duration is longer than the first TTI duration, as described above with reference to FIGS. 2 through 6. In certain examples, the operations of block 1710 may be performed by the TTI identifying component as described with reference to FIGS. 8 and 9.

At block 1715, the UE 115 may determine that the first set of transmissions is to be received at the first UE based at least in part on reception of the first control channel transmission, as described above with reference to FIGS. 2 through 6. In certain examples, the operations of block 1715 may be performed by the control based reception component as described with reference to FIGS. 8 and 9.

At block 1720, the UE 115 may receive, responsive to the determining of block 1715, the first set of transmissions using the first set of wireless resources, where the first set of wireless resources is configured with the first TTI duration, as described above with reference to FIGS. 2 through 6. In certain examples, the operations of block 1720 may be performed by the control based reception component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1725, the UE 115 may configure one or more first TTI DRX parameters separately from one or more second TTI DRX parameters, as described above with reference to FIGS. 2 through 6. In certain examples, the operations of block 1725 may be performed by the DRX component as described with reference to FIGS. 8 and 9.

Figure 18:
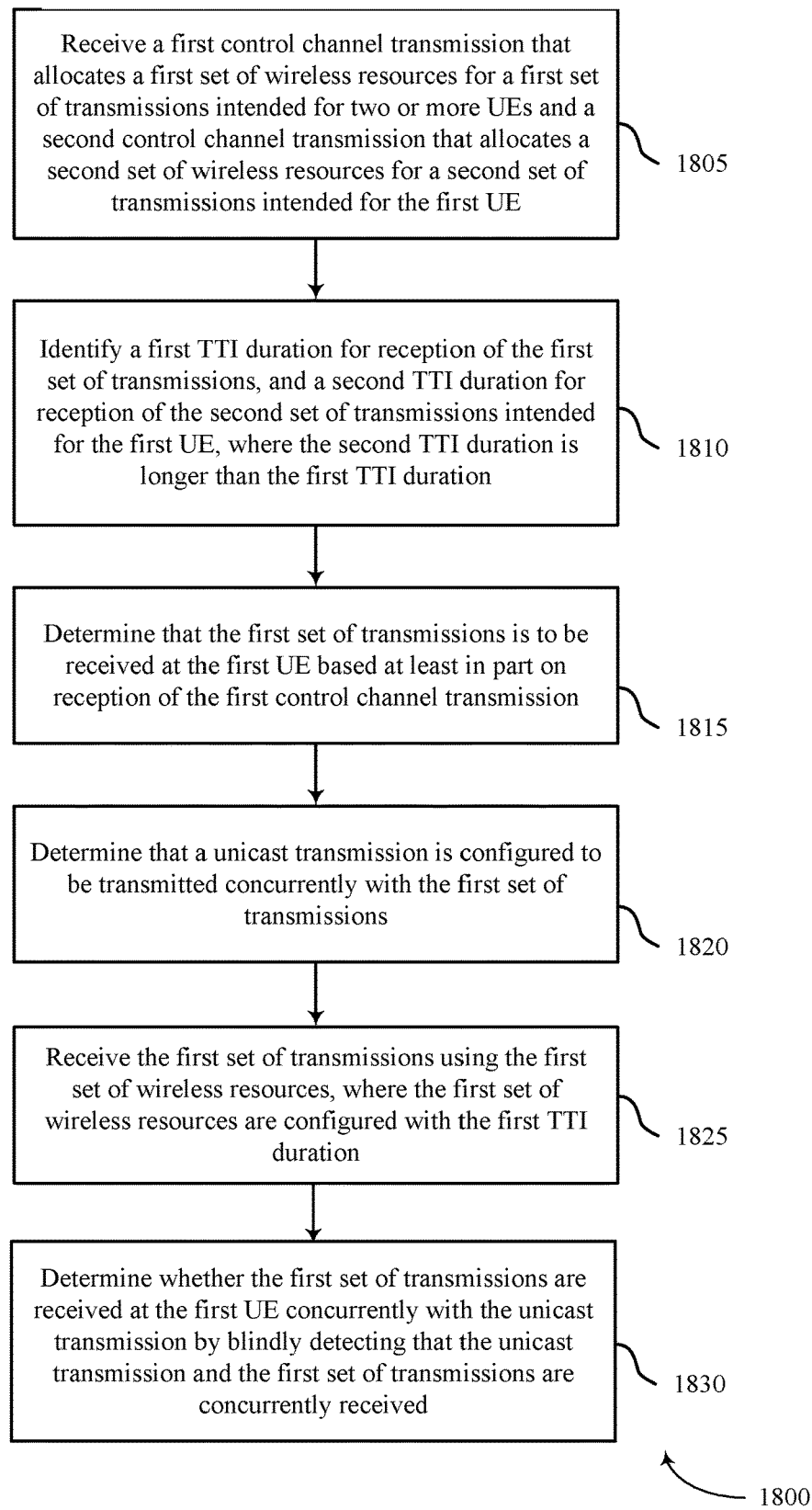

FIG. 18 shows a flowchart illustrating a method 1800 for low latency PTM communication in accordance with aspects of the present disclosure. The operations of method 1800 may be implemented by a device such as a UE 115 or its components as described with reference to FIGS. 1, 2, and 6-10. For example, the operations of method 1800 may be performed by the UE low latency communications manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive a first control channel transmission that allocates a first set of wireless resources for a first set of transmissions intended for two or more UEs and a second control channel transmission that allocates a second set of wireless resources for a second set of transmissions intended for the first UE, as described above with reference to FIGS. 2 through 6. In certain examples, the operations of block 1805 may be performed by the control channel component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1810, the UE 115 may identify a first TTI duration for reception of the first set of transmissions, and a second TTI duration for reception of the second set of transmissions intended for the first UE, where the second TTI duration is longer than the first TTI duration, as described above with reference to FIGS. 2 through 6. In certain examples, the operations of block 1810 may be performed by the TTI identifying component as described with reference to FIGS. 8 and 9.

At block 1815, the UE 115 may determine that the first set of transmissions is to be received at the first UE based at least in part on reception of the first control channel transmission, as described above with reference to FIGS. 2 through 6. In some cases, the determining whether the first set of transmissions are received at the first UE concurrently with the unicast transmission includes blindly detecting that the unicast transmission and the first set of transmissions are concurrently received. In certain examples, the operations of block 1815 may be performed by the control based reception component as described with reference to FIGS. 8 and 9.

At block 1820, the UE 115 may determine that a unicast transmission is configured to be transmitted concurrently with the first set of transmissions, as described above with reference to FIGS. 2 through 6. In certain examples, the operations of block 1820 may be performed by the unicast transmission component as described with reference to FIGS. 8 and 9.

At block 1825, the UE 115 may receive, responsive to the determining, the first set of transmissions using the first set of wireless resources, where the first set of wireless resources are configured with the first TTI duration, as described above with reference to FIGS. 2 through 6. In certain examples, the operations of block 1825 may be performed by the control based reception component as described with reference to FIGS. 8 and 9, which may operate in cooperation with a receiver 705 or 805 as described with reference to FIG. 7 or 8, or antenna(s) 1030 and transceiver(s) 1025 as described with reference to FIG. 10.

At block 1830, the UE 115 may determine whether the first set of transmissions are received at the first UE concurrently with the unicast transmission by blindly detecting that the unicast transmission and the first set of transmissions are concurrently received, as described above with reference to FIGS. 2 through 6. In certain examples, the operations of block 1830 may be performed by the unicast transmission component as described with reference to FIGS. 8 and 9.

Figure 19:
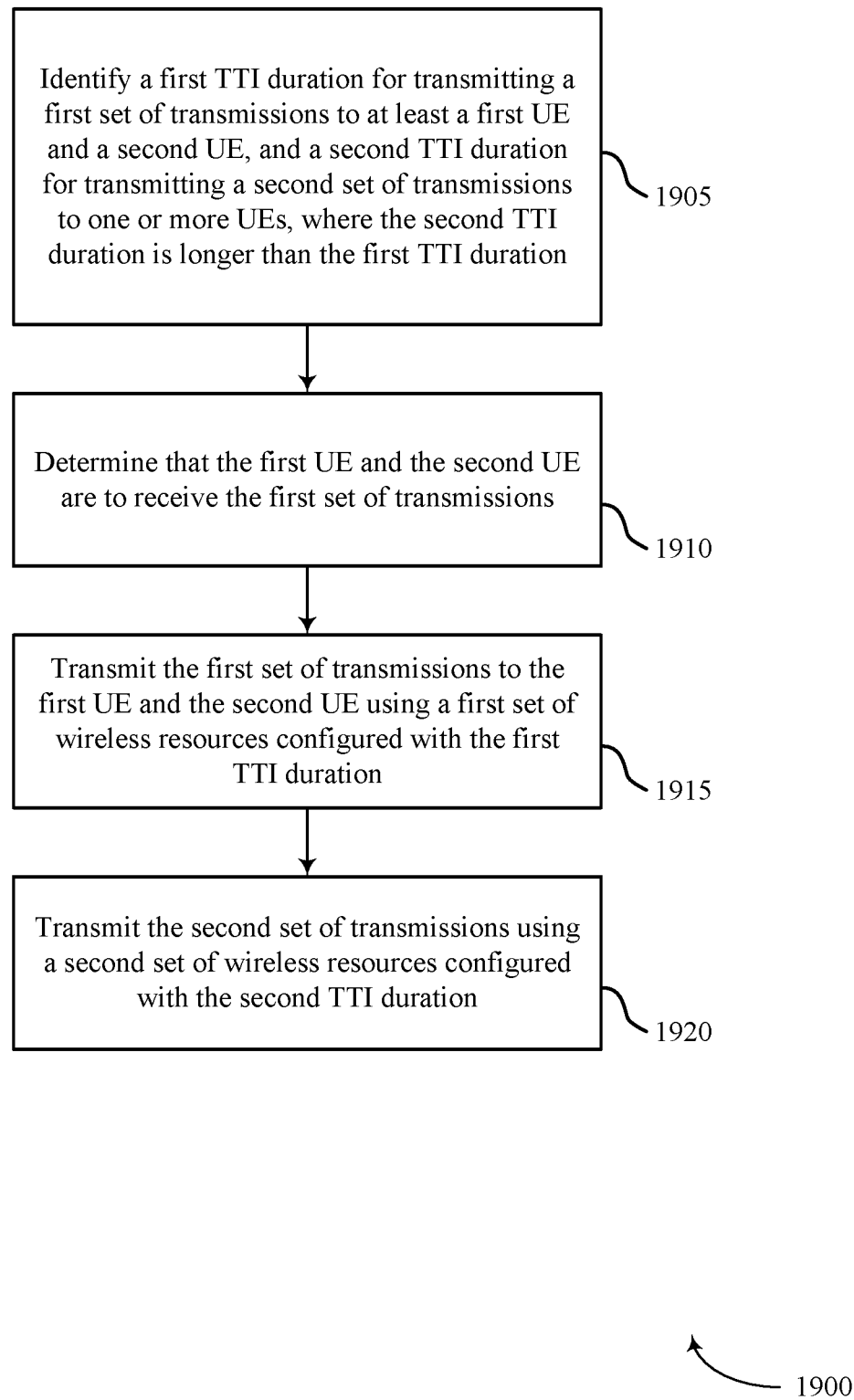

FIG. 19 shows a flowchart illustrating a method 1900 for low latency PTM communication in accordance with aspects of the present disclosure. The operations of method 1900 may be implemented by a device such as a base station 105 or its components as described with reference to FIGS. 1, 2, 6, and 11-14. For example, the operations of method 1900 may be performed by the base station low latency communications manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may identify a first TTI duration for transmitting a first set of transmissions to at least a first UE and a second UE, and a second TTI duration for transmitting a second set of transmissions to one or more UEs, where the second TTI duration is longer than the first TTI duration, as described above with reference to FIGS. 2 through 6. In certain examples, the operations of block 1905 may be performed by the TTI identifying component as described with reference to FIGS. 12 and 13.

At block 1910, the base station 105 may determine that the first UE and the second UE are to receive the first set of transmissions as described above with reference to FIGS. 2 through 6. In certain examples, the operations of block 1910 may be performed by the UE determining component as described with reference to FIGS. 12 and 13.

At block 1915, the base station 105 may transmit the first set of transmissions to the first UE and the second UE using a first set of wireless resources configured with the first TTI duration, as described above with reference to FIGS. 2 through 6. In certain examples, the operations of block 1915 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 1920, the base station 105 may transmit the second set of transmissions using a second set of wireless resources configured with the second TTI duration, as described above with reference to FIGS. 2 through 6. In certain examples, the operations of block 1920 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

Figure 20:
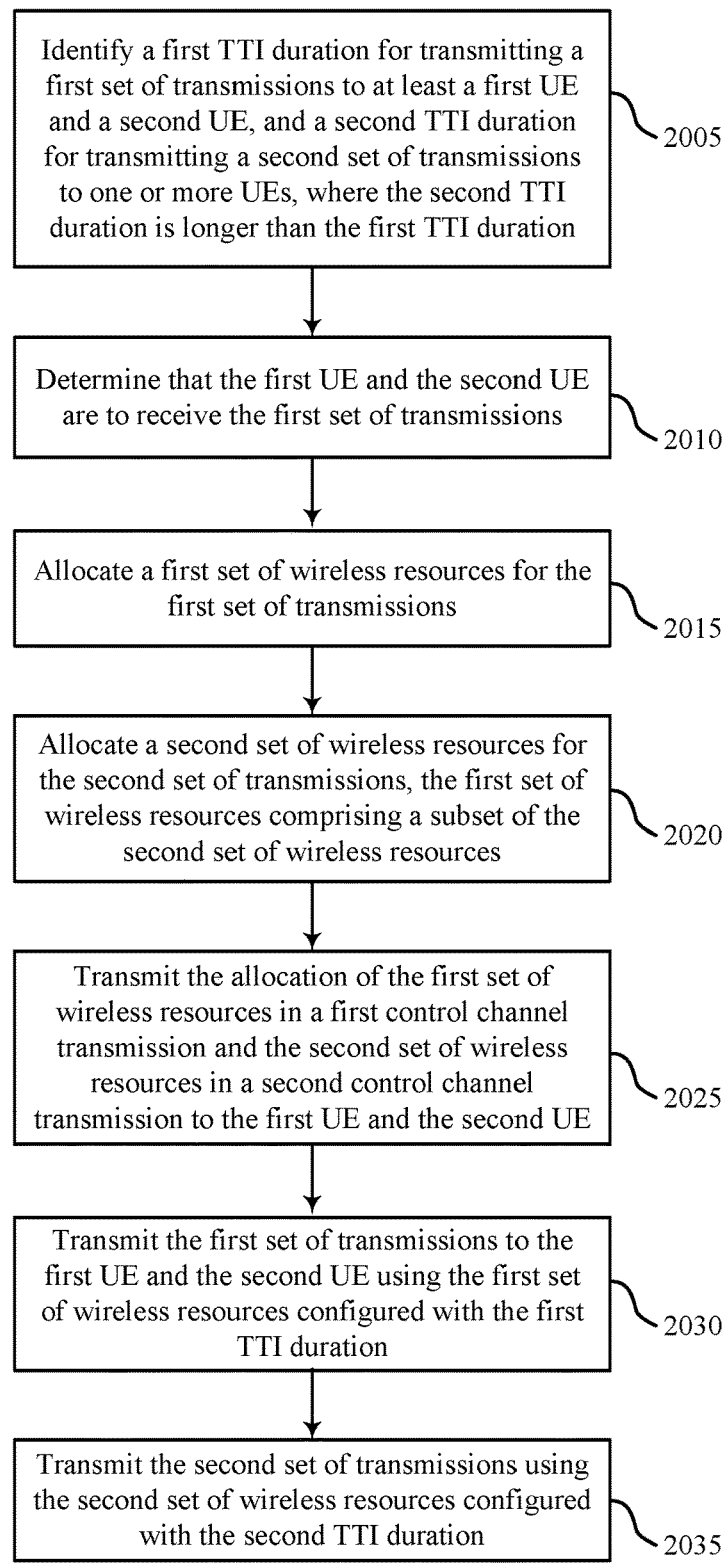

FIG. 20 shows a flowchart illustrating a method 2000 for low latency PTM communication in accordance with aspects of the present disclosure. The operations of method 2000 may be implemented by a device such as a base station 105 or its components as described with reference to FIGS. 1, 2, 6, and 11-14. For example, the operations of method 2000 may be performed by the base station low latency communications manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may identify a first TTI duration for transmitting a first set of transmissions to at least a first UE and a second UE, and a second TTI duration for transmitting a second set of transmissions to one or more UEs, where the second TTI duration is longer than the first TTI duration, as described above with reference to FIGS. 2 through 6. In certain examples, the operations of block 2005 may be performed by the TTI identifying component as described with reference to FIGS. 12 and 13.

At block 2010, the base station 105 may determine that the first UE and the second UE are to receive the first set of transmissions as described above with reference to FIGS. 2 through 6. In certain examples, the operations of block 2010 may be performed by the UE determining component as described with reference to FIGS. 12 and 13.

At block 2015, the base station 105 may allocate a first set of wireless resources for the first set of transmissions as described above with reference to FIGS. 2 through 6. In certain examples, the operations of block 2015 may be performed by the resource allocation component as described with reference to FIGS. 12 and 13.

At block 2020, the base station 105 may allocate a second set of wireless resources for the second set of transmissions, the first set of wireless resources including a subset of the second set of wireless resources, as described above with reference to FIGS. 2 through 6. In certain examples, the operations of block 2020 may be performed by the resource allocation component as described with reference to FIGS. 12 and 13.

At block 2025, the base station 105 may transmit the allocation of the first set of wireless resources in a first control channel transmission and the second set of wireless resources in a second control channel transmission to the first UE and the second UE, as described above with reference to FIGS. 2 through 6. In certain examples, the operations of block 2025 may be performed by the resource allocation component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2030, the base station 105 may transmit the first set of transmissions to the first UE and the second UE using the first set of wireless resources configured with the first TTI duration, as described above with reference to FIGS. 2 through 6. In certain examples, the operations of block 2030 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2035, the base station 105 may transmit the second set of transmissions using the second set of wireless resources configured with the second TTI duration, as described above with reference to FIGS. 2 through 6. In certain examples, the operations of block 2035 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

Figure 21:
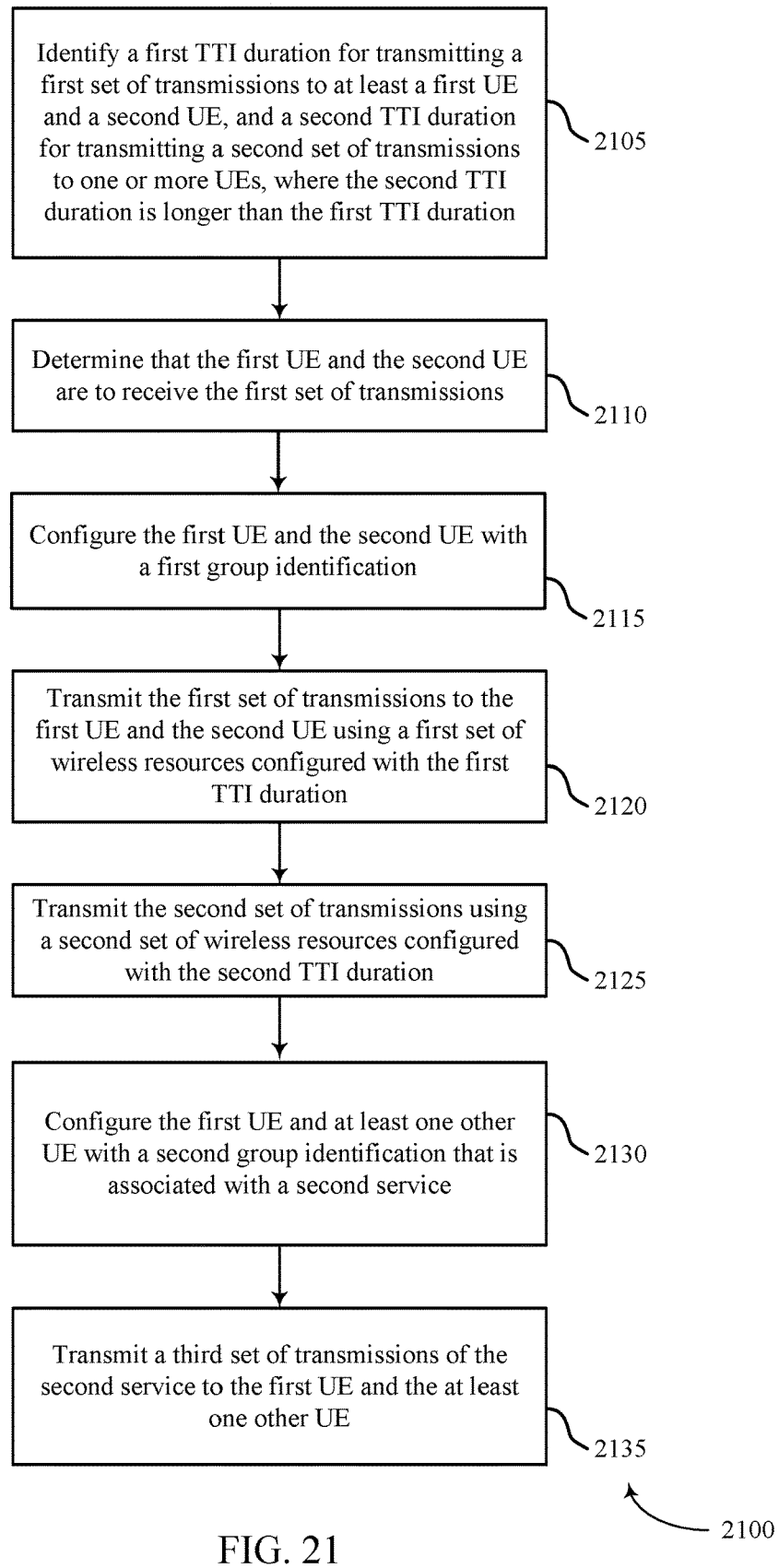

FIG. 21 shows a flowchart illustrating a method 2100 for low latency PTM communication in accordance with aspects of the present disclosure. The operations of method 2100 may be implemented by a device such as a base station 105 or its components as described with reference to FIGS. 1, 2, 6, and 11-14. For example, the operations of method 2100 may be performed by the base station low latency communications manager as described herein. In some examples, the base station 105 may execute a set of codes to control the functional elements of the device to perform the functions described below. Additionally or alternatively, the base station 105 may perform aspects the functions described below using special-purpose hardware.

At block 2105, the base station 105 may identify a first TTI duration for transmitting a first set of transmissions to at least a first UE and a second UE, and a second TTI duration for transmitting a second set of transmissions to one or more UEs, where the second TTI duration is longer than the first TTI duration, as described above with reference to FIGS. 2 through 6. In certain examples, the operations of block 2105 may be performed by the TTI identifying component as described with reference to FIGS. 12 and 13.

At block 2110, the base station 105 may determine that the first UE and the second UE are to receive the first set of transmissions as described above with reference to FIGS. 2 through 6. In certain examples, the operations of block 2110 may be performed by the UE determining component as described with reference to FIGS. 12 and 13.

At block 2115, the base station 105 may the configure the first UE and the second UE with a first group identification as described above with reference to FIGS. 2 through 6. In certain examples, the operations of block 2115 may be performed by the UE grouping component as described with reference to FIGS. 12 and 13.

At block 2120, the base station 105 may transmit the first set of transmissions to the first UE and the second UE using a first set of wireless resources configured with the first TTI duration, as described above with reference to FIGS. 2 through 6. In certain examples, the operations of block 2120 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2125, the base station 105 may transmit the second set of transmissions using a second set of wireless resources configured with the second TTI duration, as described above with reference to FIGS. 2 through 6. In certain examples, the operations of block 2125 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2130, when the first group identification is associated with a first broadcast service, the base station 105 may configure the first UE and at least one other UE with a second group identification that is associated with a second service as described above with reference to FIGS. 2 through 6. In certain examples, the operations of block 2130 may be performed by the UE grouping component as described with reference to FIGS. 12 and 13.

At block 2135, the base station 105 may transmit a third set of transmissions of the second service to the first UE and the at least one other UE, as described above with reference to FIGS. 2 through 6. In certain examples, the operations of block 2135 may be performed by the UE grouping component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

Figure 22:
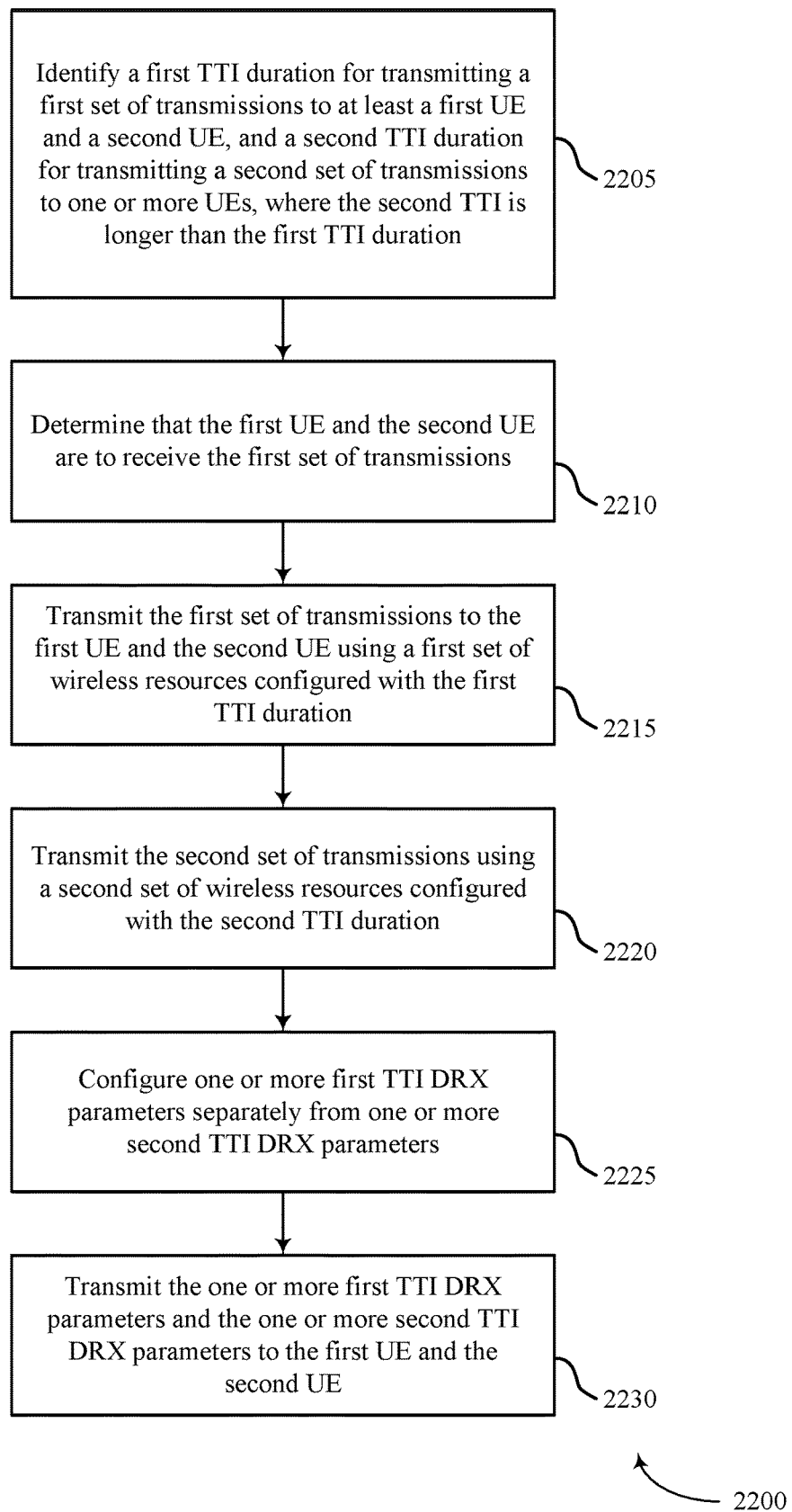

FIG. 22 shows a flowchart illustrating a method 2200 for low latency PTM communication in accordance with aspects of the present disclosure. The operations of method 2200 may be implemented by a device such as a base station 105 or its components as described with reference to FIGS. 1, 2, 6 and 11-14. For example, the operations of method 2200 may be performed by the base station low latency communications manager as described herein. In some examples, the base station 105 may execute a set of codes to control the functional elements of the device to perform the functions described below. Additionally or alternatively, the base station 105 may perform aspects the functions described below using special-purpose hardware.

At block 2205, the base station 105 may identify a first TTI duration for transmitting a first set of transmissions to at least a first UE and a second UE, and a second TTI duration for transmitting a second set of transmissions to one or more UEs, where the second TTI duration is longer than the first TTI duration, as described above with reference to FIGS. 2 through 6. In certain examples, the operations of block 2205 may be performed by the TTI identifying component as described with reference to FIGS. 12 and 13.

At block 2210, the base station 105 may determine that the first UE and the second UE are to receive the first set of transmissions as described above with reference to FIGS. 2 through 6. In certain examples, the operations of block 2210 may be performed by the UE determining component as described with reference to FIGS. 12 and 13.

At block 2215, the base station 105 may transmit the first set of transmissions to the first UE and the second UE using a first set of wireless resources configured with the first TTI duration, as described above with reference to FIGS. 2 through 6. In certain examples, the operations of block 2215 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2220, the base station 105 may transmit the second set of transmissions using a second set of wireless resources configured with the second TTI duration, as described above with reference to FIGS. 2 through 6. In certain examples, the operations of block 2220 may be performed by the transmission configuration component, as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2225, the base station 105 may configure one or more first TTI DRX parameters separately from one or more second TTI DRX parameters, as described above with reference to FIGS. 2 through 6. In certain examples, the operations of block 2225 may be performed by the DRX component as described with reference to FIGS. 12 and 13.

At block 2230, the base station 105 may transmit the one or more first TTI DRX parameters and the one or more second TTI DRX parameters to the first UE and the second UE as described above with reference to FIGS. 2 through 6. In certain examples, the operations of block 2230 may be performed by the DRX component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

Figure 23:
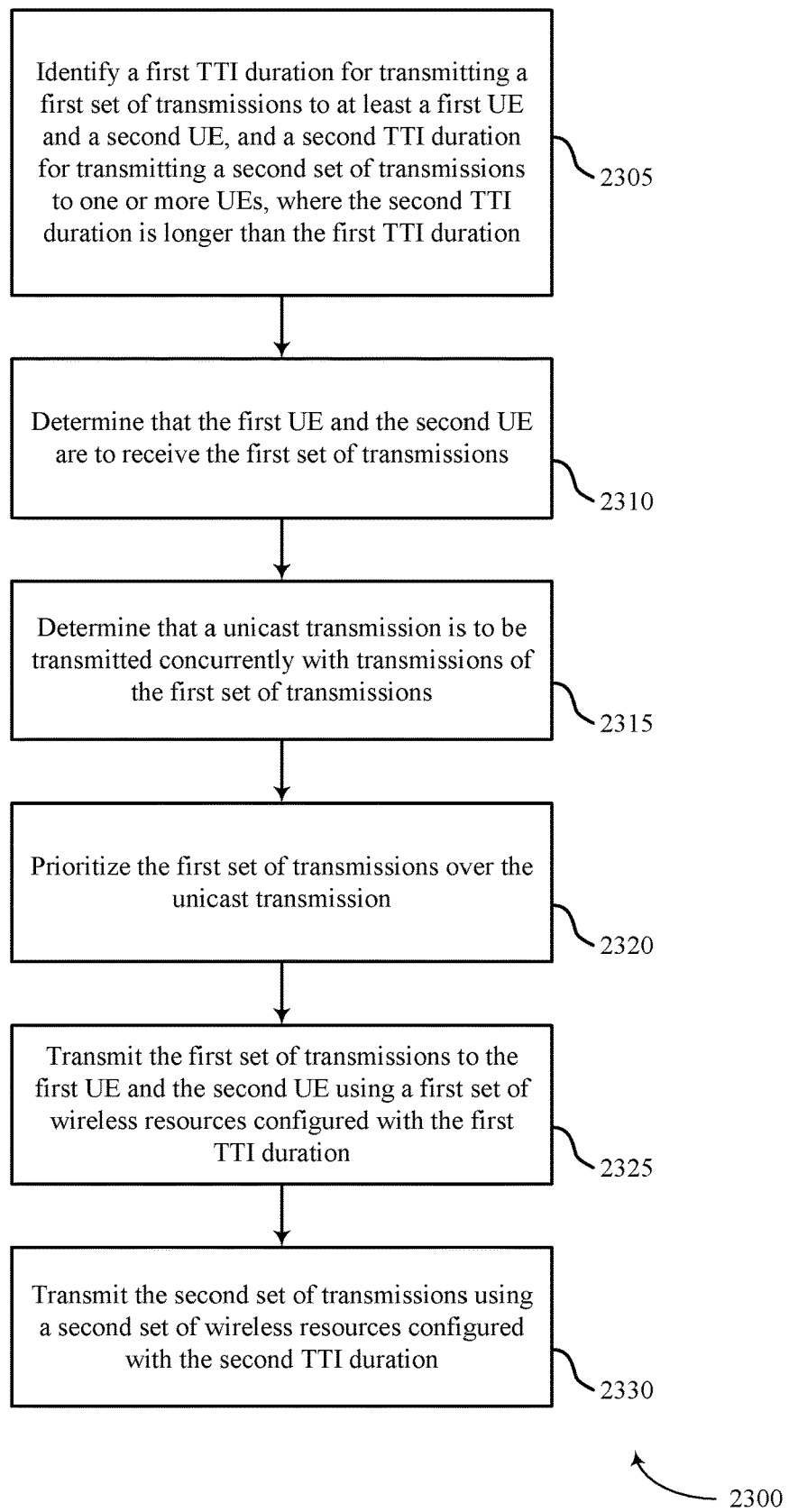

FIG. 23 shows a flowchart illustrating a method 2300 for low latency PTM communication in accordance with aspects of the present disclosure. The operations of method 2300 may be implemented by a device such as a base station 105 or its components as described with reference to FIGS. 1, 2, 6, and 11-14. For example, the operations of method 2300 may be performed by the base station low latency communications manager as described herein. In some examples, the base station 105 may execute a set of codes to control the functional elements of the device to perform the functions described below. Additionally or alternatively, the base station 105 may perform aspects the functions described below using special-purpose hardware.

At block 2305, the base station 105 may identify a first TTI duration for transmitting a first set of transmissions to at least a first UE and a second UE, and a second TTI duration for transmitting a second set of transmissions to one or more UEs, where the second TTI duration is longer than the first TTI duration, as described above with reference to FIGS. 2 through 6. In certain examples, the operations of block 2305 may be performed by the TTI identifying component as described with reference to FIGS. 12 and 13.

At block 2310, the base station 105 may determine that the first UE and the second UE are to receive the first set of transmissions, as described above with reference to FIGS. 2 through 6. In certain examples, the operations of block 2310 may be performed by the UE determining component as described with reference to FIGS. 12 and 13.

At block 2315, the base station 105 may determine that a unicast transmission is to be transmitted concurrently with transmissions of the first set of transmissions, as described above with reference to FIGS. 2 through 6. In certain examples, the operations of block 2315 may be performed by the unicast component as described with reference to FIGS. 12 and 13.

At block 2320, the base station 105 may prioritize the first set of transmissions over the unicast transmission, as described above with reference to FIGS. 2 through 6. In certain examples, the operations of block 2320 may be performed by the unicast component as described with reference to FIGS. 12 and 13.

At block 2325, the base station 105 may transmit the first set of transmissions to the first UE and the second UE using a first set of wireless resources configured with the first TTI duration, as described above with reference to FIGS. 2 through 6. In certain examples, the operations of block 2325 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

At block 2330, the base station 105 may transmit the second set of transmissions using a second set of wireless resources configured with the second TTI duration, as described above with reference to FIGS. 2 through 6. In certain examples, the operations of block 2330 may be performed by the transmission configuration component as described with reference to FIGS. 12 and 13, which may operate in cooperation with a transmitter 1110 or 1230 as described with reference to FIG. 11 or 12, or antenna(s) 1430 and transceiver(s) 1425 as described with reference to FIG. 14.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for low latency point to multipoint communication.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunications System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The features described in the present disclosure, however, describes a LTE/LTE-A system for purposes of example, and LTE terminology is used in much of the description above, although the techniques are applicable beyond LTE/LTE-A applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for low latency point to multipoint communication. It should be noted that these methods describe possible implementations, and that the operations and the steps may be rearranged or otherwise modified such that other implementations are possible. In some examples, aspects from two or more of the methods may be combined.

The various illustrative blocks and components described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Thus, the functions described herein may be performed by one or more other processing units (or cores), on at least one integrated circuit (IC). In various examples, different types of ICs may be used (e.g., Structured/Platform ASICs, a FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module,"

"mechanism," "element," "device," and the like may not be a substitute for the word "means." As such, no claim element is to be construed as a means plus function unless the element is expressly recited using the phrase "means for."

What is claimed is:

1. A method for wireless communication, comprising:
receiving, at a first user equipment (UE), a first control channel transmission that allocates a first set of wireless resources for a first set of transmissions intended for two or more UEs and a second control channel transmission that allocates a second set of wireless resources for a second set of transmissions intended for the first UE;
identifying a first transmission time interval (TTI) duration for reception of the first set of transmissions, and a second TTI duration for reception of the second set of transmissions intended for the first UE, wherein the second TTI duration is longer than the first TTI duration;
determining that the first set of transmissions is to be received at the first UE based at least in part on reception of the first control channel transmission; and
receiving, responsive to the determining, the first set of transmissions using the first set of wireless resources, wherein the first set of wireless resources is configured with the first TTI duration.

2. The method of claim 1, wherein the first control channel transmission comprises one or more of scheduling information for the first set of transmissions or monitoring durations for monitoring subsequent control channel transmissions.

3. The method of claim 1, wherein the first set of transmissions are received via a traffic channel identified by the first set of wireless resources.

4. The method of claim 3, wherein the traffic channel comprises a portion of a physical downlink shared channel (PDSCH) used for the second set of transmissions.

5. The method of claim 1, wherein identifying the first TTI duration and the second TTI duration comprises:
determining that the second TTI duration corresponds to a duration of a subframe of a radio frame and the first TTI duration corresponds to a portion of the duration of the subframe.

6. The method of claim 5, wherein the duration of the subframe comprises two or more orthogonal frequency division multiplexing (OFDM) symbol periods, and wherein the first TTI duration corresponds to one or more of the OFDM symbol periods.

7. The method of claim 6, wherein the duration of the subframe comprises a set of first TTIs having the first TTI duration, and wherein the first set of transmissions are transmitted in a same first TTI location within different subframes.

8. The method of claim 1, wherein the first UE has a first group identification and wherein determining that the first set of transmissions are intended for the first UE is based at least in part on the first group identification and a group indication associated with the first set of transmissions.

9. The method of claim 8, wherein the first group identification is associated with a first broadcast service, and wherein the method further comprises:
identifying a second group identification of the first UE that is associated with a second service; and
determining that a third set of transmissions, intended for two or more UEs and associated with the second service, are to be received at the first UE based at least in part on the second group identification and a second group indication associated with the third set of transmissions.

10. The method of claim 9, wherein the third set of transmissions use the first TTI duration, and wherein the method further comprises:
receiving the third set of transmissions using a set of wireless resources configured with the first TTI duration.

11. The method of claim 10, wherein the first set of transmissions are transmitted in a first slot of one or more subframes, and the third set of transmissions are transmitted in a second slot of the one or more subframes, the first slot of the one or more subframes and the second slot of the one of more subframes having the first TTI duration.

12. The method of claim 9, further comprising:
identifying, at the first UE, a third TTI duration for receiving the third set of transmissions; and
receiving the third set of transmissions using a set of wireless resources configured with the third TTI duration.

13. The method of claim 1, wherein the first control channel transmission indicates the first TTI duration.

14. The method of claim 13, wherein the indication of the first TTI duration is received dynamically in an indication of downlink wireless resources that include the first set of transmissions.

15. The method of claim 13, wherein the indication of the first TTI duration is received semi-statically in a system information block (SIB) that configures one or more parameters associated with the first set of transmissions.

16. The method of claim 1, wherein the first TTI duration corresponds with a duration of a low latency TTI for receiving a set of unicast transmissions transmitted to the first UE.

17. The method of claim 1, further comprising:
configuring one or more first TTI discontinuous reception (DRX) parameters separately from one or more second TTI DRX parameters.

18. The method of claim 17, wherein the configuring comprises one or more of:
discontinuing DRX when it is determined that the first set of transmissions are to be received at the first UE,
setting the one or more first TTI DRX parameters based at least in part on a traffic type of the first set of transmissions, or
setting a first TTI DRX periodicity or offset based on the second TTI duration and setting a first TTI DRX on-duration based on the first TTI duration.

19. An apparatus for wireless communication comprising:
a processor;
memory in electronic communication with the processor; and
instructions stored in the memory and operable, when executed by the processor, to cause the apparatus to:
receive, at a first user equipment (UE), a first control channel transmission that allocates a first set of wireless resources for a first set of transmissions intended for two or more UEs and a second control channel transmission that allocates a second set of wireless resources for a second set of transmissions intended for the first UE;
identify a first transmission time interval (TTI) duration for reception of the first set of transmissions, and a second TTI duration for reception of the second set of transmissions intended for the first UE, wherein the second TTI duration is longer than the first TTI duration;

determine that the first set of transmissions is to be received at the first UE based at least in part on reception of the first control channel transmission; and receive, responsive to the determining, the first set of transmissions using the first set of wireless resources, wherein the first set of wireless resources is configured with the first TTI duration.

20. The apparatus of claim 19, wherein the first control channel transmission comprises one or more of scheduling information for the first set of transmissions or monitoring durations for monitoring subsequent control channel transmissions.

21. The apparatus of claim 19, wherein the first set of transmissions are received a traffic channel identified by the first set of wireless resources.

22. The apparatus of claim 21, wherein the traffic channel comprises a portion of a physical downlink shared channel (PDSCH) used for the second set of transmissions.

23. The apparatus of claim 19, wherein the instructions to identify the first TTI duration and the second TTI duration are operable to cause the apparatus to:

determine that the second TTI duration corresponds to a duration of a subframe of a radio frame and the first TTI duration corresponds to a portion of the duration of the subframe.

24. The apparatus of claim 19, wherein the first UE has a first group identification and wherein the instructions to determine that the first set of transmissions are intended for the first UE are operable based at least in part on the first group identification and a group indication associated with the first set of transmissions.

25. The apparatus of claim 24, wherein the first group identification is associated with a first broadcast service, and the apparatus further comprising instructions operable to cause the apparatus to:

identify a second group identification of the first UE that is associated with a second service; and determine that a third set of transmissions, intended for two or more UEs and associated with the second service, are to be received at the first UE based at least in part on the second group identification and a second group indication associated with the third set of transmissions.

26. The apparatus of claim 19, wherein the first control channel transmission indicates the first TTI duration.

27. The apparatus of claim 19, wherein the first TTI duration corresponds with a duration of a low latency TTI for receiving a set of unicast transmissions transmitted to the first UE.

28. The apparatus of claim 19, further comprising instructions operable to cause the apparatus to:

configure one or more first TTI discontinuous reception (DRX) parameters separately from one or more second TTI DRX parameters.

29. An apparatus for wireless communication comprising:

means for receiving, at a first user equipment (UE), a first control channel transmission that allocates a first set of wireless resources for a first set of transmissions intended for two or more UEs and a second control channel transmission that allocates a second set of wireless resources for a second set of transmissions intended for the first UE;

means for identifying a first transmission time interval (TTI) duration for reception of the first set of transmissions, and a second TTI duration for reception of the second set of transmissions intended for the first UE, wherein the second TTI duration is longer than the first TTI duration;

means for determining that the first set of transmissions is to be received at the first UE based at least in part on reception of the first control channel transmission; and means for receiving, responsive to the determining, the first set of transmissions using the first set of wireless resources, wherein the first set of wireless resources is configured with the first TTI duration.

30. A non-transitory computer-readable medium storing code for wireless communication, the code comprising instructions executable to:

receive, at a first user equipment (UE), a first control channel transmission that allocates a first set of wireless resources for a first set of transmissions intended for two or more UEs and a second control channel transmission that allocates a second set of wireless resources for a second set of transmissions intended for the first UE;

identify a first transmission time interval (TTI) duration for reception of the first set of transmissions, and a second TTI duration for reception of the second set of transmissions intended for the first UE, wherein the second TTI duration is longer than the first TTI duration;

determine that the first set of transmissions is to be received at the first UE based at least in part on reception of the first control channel transmission; and receive, responsive to the determining, the first set of transmissions using the first set of wireless resources, wherein the first set of wireless resources is configured with the first TTI duration.

* * * * *